(12) United States Patent
Wang et al.

(10) Patent No.: US 11,051,315 B2
(45) Date of Patent: Jun. 29, 2021

(54) DATA EXCHANGE METHOD, TERMINAL DEVICE, AND NETWORK DEVICE

(71) Applicant: HUAWEI TECHNOLOGIES CO., LTD., Shenzhen (CN)

(72) Inventors: Zhe Wang, Shenzhen (CN); Deping Liu, Beijing (CN); Zhenshan Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 16/587,042

(22) Filed: Sep. 29, 2019

(65) Prior Publication Data

US 2020/0029343 A1   Jan. 23, 2020

Related U.S. Application Data

(63) Continuation of application No. PCT/CN2017/078796, filed on Mar. 30, 2017.

(51) Int. Cl.

| | |
|---|---|
| *H04W 72/12* | (2009.01) |
| *H04B 7/10* | (2017.01) |
| *H04W 4/46* | (2018.01) |
| *H04W 72/04* | (2009.01) |
| *H04W 74/08* | (2009.01) |

(Continued)

(52) U.S. Cl.
CPC ............ *H04W 72/12* (2013.01); *H04B 7/10* (2013.01); *H04W 4/46* (2018.02); *H04W 72/044* (2013.01); *H04W 74/0816* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 8,320,926 B2 * | 11/2012 | Hagerman | H04B 7/10 455/450 |
| 9,264,907 B2 * | 2/2016 | Laroia | H04W 16/12 |
| 9,451,631 B2 | 9/2016 | Lee et al. | |

(Continued)

FOREIGN PATENT DOCUMENTS

| | | |
|---|---|---|
| CN | 101834707 A | 9/2010 |
| CN | 104244449 A | 12/2014 |

(Continued)

*Primary Examiner* — Tri H Phan
(74) *Attorney, Agent, or Firm* — Rimon PC

(57) ABSTRACT

Embodiments provide a data exchange method, a terminal device, and a network device. In accordance with the disclosure, a terminal device can obtain resource information for communicating with another terminal device. The resource information can indicate a time-frequency resource and an antenna port corresponding to an antenna polarization direction. The terminal device can then send scheduling information and data information to the another terminal device using the time-frequency resource and the antenna polarization direction. Time-frequency resources and/or antenna polarization directions used by any two terminal devices to send scheduling information and data information to other terminal devices can be different. In this way, terminal devices using different transmit antenna ports can use a same time-frequency resource, and an optional dimension of resource information is increased, thereby increasing an overall system communication capacity.

18 Claims, 9 Drawing Sheets

(51) Int. Cl.
*H04W 74/02* (2009.01)
*H04W 4/80* (2018.01)

(56) References Cited

U.S. PATENT DOCUMENTS

| | | | |
|---|---|---|---|
| 10,314,092 B2 * | 6/2019 | Lee | H04W 76/14 |
| 10,425,145 B2 * | 9/2019 | Kim | H04B 7/0639 |
| 10,530,450 B2 * | 1/2020 | Ren | H04B 7/06 |
| 10,742,291 B2 * | 8/2020 | Park | H04W 76/27 |
| 10,869,297 B2 * | 12/2020 | Seo | H04L 5/0051 |
| 2009/0017829 A1 | 1/2009 | Laroia et al. | |
| 2018/0041265 A1 | 2/2018 | Su | |
| 2018/0338319 A1 | 11/2018 | Kim et al. | |

FOREIGN PATENT DOCUMENTS

| | | |
|---|---|---|
| CN | 104254132 A | 12/2014 |
| CN | 105453679 A | 3/2016 |
| CN | 106209195 A | 12/2016 |
| EP | 3021498 A1 | 5/2016 |
| EP | 3319381 A1 | 5/2018 |
| WO | 2016021949 A1 | 2/2016 |
| WO | 2017007184 A1 | 1/2017 |

\* cited by examiner

DATA EXCHANGE METHOD, TERMINAL DEVICE, AND NETWORK DEVICE

CROSS-REFERENCE TO RELATED APPLICATIONS

This application is a continuation of International Application No. PCT/CN2017/078796, filed on Mar. 30, 2017, the disclosure of which is hereby incorporated by reference in its entirety.

TECHNICAL FIELD

This application relates to communications technologies, and in particular, to a data exchange method, a terminal device, and a network device.

BACKGROUND

With the continuous development of science and technology, a car has become a widely used means of transport. In a large background of the Internet of Things, with the rise of concepts such as the Internet of Vehicles and an intelligent transportation system (Intelligent Transportation System, ITS for short) and related industries, a communications pipeline technology related to vehicle to vehicle (Vehicle to Vehicle, V2V for short) communication becomes one of research hotspots. Specifically, a vehicle broadcasts, to a surrounding vehicle through V2V communication, information such as a vehicle speed, a driving direction, and a specific location of the vehicle, and whether an emergency brake is applied to the vehicle; and meanwhile, the vehicle obtains such information of another vehicle, so as to better perceive a traffic status beyond a visual range, thereby allowing a driver or an auxiliary/autonomous driving system of the vehicle to determine a danger or another situation in advance and make avoidance accordingly, or to perform some collaborative traffic behaviors.

The IEEE 802.11p (also referred to as WAVE, Wireless Access in the Vehicular Environment) standard is a communication protocol extended based on the IEEE 802.11 standard. 802.11p is a technology that is proposed earlier, and is an alternative dedicated short range communication (dedicated short range communication, DSRC for short) solution for vehicle to vehicle/vehicle to road direct communication. In addition, the third Generation Partnership Project (the third Generation Partnership Project, 3GPP for short) organization is actively promoting standardization of an in-vehicle communication solution based on long term evolution (Long Term Evolution, LTE), where a direct broadcast link used for low-delay transmission of a safety message is a part of an Internet of Vehicles communication solution that is based on long term evolution-vehicle (Long Term Evolution-Vehicle, LTE-V for short).

During application, 802.11p uses the contention-based carrier sense multiple access/collision avoidance (Carrier Sense Multiple Access/collision avoidance, CSMA/CA for short) protocol, in which each terminal autonomously contends for a frequency resource randomly. Although this mechanism is flexible and convenient for networking, when there are a large quantity of vehicles, a collision probability is greatly increased, and the terminal can hardly obtain a resource through contention to send a message in time, which causes a message latency and greatly reduces reliability.

However, different from a working principle of the asynchronous 802.11p system, LTE-V is a synchronization system using a same synchronization source, and has two working modes: a free contention mode and a network scheduling mode. In the free contention mode, a sensing/reservation (sensing/reservation) mechanism is used, collisions between users are alleviated through sensing and detection, and a plurality of periodic time-frequency resources can be preempted at one time through resource reservation. This mechanism has a same problem as the CSMA/CA, that is, efficiency is quite low when there are a large quantity of vehicles. However, by comparison, an advantage of LTE-V lies in that when overall network performance is reduced due to resource shortage, a base station may perform scheduling in a centralized manner, for example, may reduce message sending frequency of all vehicles in a specific area, to reduce a collision probability. However, this is a compromise between performance and capacity. In the network scheduling mode, resource allocation for all terminal devices is completed by the base station through scheduling. Because there is a network node that centrally coordinates and optimizes behavior of all terminal devices, system efficiency can be significantly improved, and theoretically, optimal attainable system performance can be achieved while a resource constraint condition is met.

However, in the resource allocation manner based on centralized network scheduling, although optimal performance can be theoretically achieved under a resource constraint condition, when resources and users are in severe conflict, a part of performance needs to be sacrificed to reach a compromise between performance and capacity. Therefore, in a V2V network, a conflict between limited system bandwidth and high-density services is still present and prominent.

SUMMARY

This application provides a data exchange method, a terminal device, and a network device, so as to resolve a prior-art problem that a conflict between limited system bandwidth and high-density services is still present and prominent.

According to a first aspect, this application provides a data exchange method, including:
  obtaining, by a terminal device, resource information that can be used to communicate with another terminal device, where the resource information is used to indicate a time-frequency resource and an antenna port used for the communication, and each antenna port is corresponding to an antenna polarization direction; and
  sending, by the terminal device, scheduling information and data information to the another terminal device by using the time-frequency resource and the antenna polarization direction, where
  the scheduling information includes the antenna polarization direction and the time-frequency resource used to carry the data information, and time-frequency resources and/or antenna polarization directions that are used by any two terminal devices to send scheduling information and data information to other terminal devices are different.

In a possible design, the sending, by the terminal device, scheduling information and data information to the another terminal device by using the time-frequency resource and the antenna polarization direction includes:
  broadcasting, by a first terminal device, first scheduling information and first data information to another terminal device by using a first time-frequency resource and a first antenna polarization direction; and broadcasting, by a second terminal device, second scheduling information and second data information to another terminal device by using a second time-frequency resource and a second antenna polarization direction; where the first time-frequency resource is the same as or partially the same as the second time-frequency resource, and the first antenna polarization direction is different from the second antenna polarization direction.

In a possible design, the first antenna polarization direction is orthogonal to the second antenna polarization direction.

In a possible design, the sending, by the terminal device, scheduling information and data information to the another terminal device by using the time-frequency resource and the antenna polarization direction includes:

broadcasting, by a first terminal device, first scheduling information and first data information to another terminal device by using a first time-frequency resource and a first antenna polarization direction; and broadcasting, by a second terminal device, second scheduling information and second data information to another terminal device by using a second time-frequency resource and a second antenna polarization direction; where the first time-frequency resource is different from the second time-frequency resource, and the first antenna polarization direction is the same as or different from the second antenna polarization direction.

In a possible design, the obtaining, by a terminal device, resource information that can be used to communicate with another terminal device includes:

receiving, by the terminal device, a scheduling instruction sent by a network device, where the scheduling instruction includes the time-frequency resource and the antenna polarization direction that are allocated for the communicative connection between the terminal device and the another terminal device, and time-frequency resources and/or antenna polarization directions that are allocated to any two terminal devices to communicatively connect to other terminal devices are different.

In a possible design, before the receiving, by the terminal device, a scheduling instruction sent by a network device, the method further includes:

sending, by the terminal device, a terminal capability to the network device, where the terminal capability includes at least an antenna polarization capability of the terminal; and sending, by the terminal device to the network device, a communication request for communicating with the another terminal device, so that the network device allocates the time-frequency resource and the antenna polarization direction for the communicative connection between the terminal device and the another terminal device based on the antenna polarization capability of the terminal.

In a possible design, the obtaining, by a terminal device, resource information that can be used to communicate with another terminal device includes:

obtaining, by the terminal device, information about a used resource occupied by a surrounding terminal, where the information about the used resource is used to indicate a time-frequency resource and an antenna polarization direction that have been occupied for communication; and selecting, by the terminal device based on the information about the used resource, the time-frequency resource and the antenna polarization direction for communicating with the another terminal device, where at least one of the selected time-frequency resource and the selected antenna polarization direction is different from the time-frequency resource and the antenna polarization direction that are occupied by the surrounding terminal.

In a possible design, the obtaining, by the terminal device, information about a used resource occupied by a surrounding terminal includes:

receiving, by the terminal device, scheduling information sent by the surrounding terminal; and obtaining, by the terminal device based on the scheduling information, the time-frequency resource and the antenna polarization direction that are occupied by the surrounding terminal.

In a possible design, the obtaining, by the terminal device based on the scheduling information, the information about the used resource occupied by the surrounding terminal includes:

demodulating, by the terminal device, the scheduling information to obtain the time-frequency resource and the antenna polarization direction that are occupied by the surrounding terminal to send data information.

In a possible design, the demodulating, by the terminal device, the scheduling information includes:

demodulating, by the terminal device, the scheduling information in a preset spatial multiplexing detection manner, to obtain the antenna polarization direction and the time-frequency resource used to carry the data information that are in the scheduling information; and/or demodulating, by the terminal device, the scheduling information in a preset non-spatial multiplexing detection manner, to obtain the antenna polarization direction and the time-frequency resource used to carry the data information that are in the scheduling information.

According to a second aspect, this application provides a data exchange method, including:

allocating, by a network device, a time-frequency resource and an antenna port for a communicative connection between a terminal device and another terminal device, where each antenna port is corresponding to an antenna polarization direction, and time-frequency resources and/or antenna polarization directions that are allocated to any two terminal devices to communicatively connect to other terminal devices are different; and sending, by the network device, the allocated time-frequency resource and antenna polarization direction to the terminal device by using a scheduling instruction.

In a possible design, the allocating, by a network device, a time-frequency resource and an antenna port for a communicative connection between a terminal device and another terminal device includes:

receiving, by the network device, a communication request for communicatively connecting to the another terminal device that is sent by the terminal device;

receiving, by the network device, a terminal capability sent by the terminal device, where the terminal capability includes at least an antenna polarization capability of the terminal; and allocating, by the network device, the time-frequency resource and the antenna polarization direction for the communicative connection between the terminal device and the another terminal device based on the antenna polarization capability of the terminal.

In a possible design, the allocating, by the network device, the time-frequency resource and the antenna polarization direction for the communicative connection between the terminal device and the another terminal device based on the antenna polarization capability of the terminal includes:

allocating, by the network device, a first time-frequency resource and a first antenna polarization direction for a communicative connection between a first terminal device and another terminal device; and allocating, by the network device, a second time-frequency resource and a second antenna polarization direction for a communicative connection between a second terminal device and another terminal device; where the first time-frequency resource is the same as or partially the same as the second time-frequency resource, and the first antenna polarization direction is different from the second antenna polarization direction.

In a possible design, the first antenna polarization direction is orthogonal to the second antenna polarization direction.

In a possible design, the allocating, by the network device, the time-frequency resource and the antenna polarization direction for the communicative connection between the terminal device and the another terminal device based on the antenna polarization capability of the terminal includes:

allocating, by the network device, a first time-frequency resource and a first antenna polarization direction for a communicative connection between a first terminal device and another terminal device; and allocating, by the network device, a second time-frequency resource and a second antenna polarization direction for a communicative connection between a second terminal device and another terminal device; where the first time-frequency resource is different from the second time-frequency resource, and the first antenna polarization direction is the same as or different from the second antenna polarization direction.

According to a third aspect, this application provides a data exchange method, including:

receiving, by a terminal device, scheduling information sent by another terminal device; and obtaining, by the terminal device based on the scheduling information, information about a resource used to carry data information, where the resource information is used to indicate a time-frequency resource and an antenna port used for communication; where each antenna port is corresponding to an antenna polarization direction, and time-frequency resources and/or antenna polarization directions that are used by the terminal device to receive scheduling information sent by any two other terminal devices are different.

In a possible design, the receiving, by a terminal device, scheduling information sent by another terminal device includes:

receiving, by the terminal device, first scheduling information sent by a first terminal device by using a first time-frequency resource and a first antenna polarization direction; and receiving, by the terminal device, second scheduling information sent by a second terminal device by using a second time-frequency resource and a second antenna polarization direction; where the first time-frequency resource is the same as or partially the same as the second time-frequency resource, and the first antenna polarization direction is different from the second antenna polarization direction.

In a possible design, the first antenna polarization direction is orthogonal to the second antenna polarization direction.

In a possible design, the sending unit includes:

a first sending subunit, configured to broadcast first scheduling information and first data information to another terminal device by using a first time-frequency resource and a first antenna polarization direction; and a second sending subunit, configured to broadcast second scheduling information and second data information to another terminal device by using a second time-frequency resource and a second antenna polarization direction; where the first time-frequency resource is different from the second time-frequency resource, and the first antenna polarization direction is the same as or different from the second antenna polarization direction.

In a possible design, the obtaining, by the terminal device based on the scheduling information, information about a resource used to carry data information includes:

demodulating, by the terminal device, the scheduling information, obtaining the antenna polarization direction and the time-frequency resource used to carry the data information, and obtaining, based on the time-frequency resource, the data information sent by the another terminal device.

In a possible design, the demodulating, by the terminal device, the scheduling information includes:

demodulating, by the terminal device, the scheduling information in a preset spatial multiplexing detection manner, to obtain the antenna polarization direction and the time-frequency resource used to carry the data information that are in the scheduling information; and/or demodulating, by the terminal device, the scheduling information in a preset non-spatial multiplexing detection manner, to obtain the antenna polarization direction and the time-frequency resource used to carry the data information that are in the scheduling information.

According to a fourth aspect, this application provides a terminal device, including:

an obtaining unit, configured to obtain resource information that can be used to communicate with another terminal device, where the resource information is used to indicate a time-frequency resource and an antenna port used for the communication, and each antenna port is corresponding to an antenna polarization direction; and a sending unit, configured to send scheduling information and data information to the another terminal device by using the time-frequency resource and the antenna polarization direction, where the scheduling information includes the antenna polarization direction and the time-frequency resource used to carry the data information, and time-frequency resources and/or antenna polarization directions that are used by any two terminal devices to send scheduling information and data information to other terminal devices are different.

In a possible design, the sending unit includes:

a first sending subunit, configured to broadcast first scheduling information and first data information to another terminal device by using a first time-frequency resource and a first antenna polarization direction; and a second sending subunit, configured to broadcast second scheduling information and second data information to another terminal device by using a second time-frequency resource and a second antenna polarization direction; where the first time-frequency resource is the same as or partially the same as the second time-frequency resource, and the first antenna polarization direction is different from the second antenna polarization direction.

In a possible design, the first antenna polarization direction is orthogonal to the second antenna polarization direction.

In a possible design, the sending unit includes:

a first sending subunit, configured to broadcast first scheduling information and first data information to another terminal device by using a first time-frequency resource and a first antenna polarization direction; and a second sending subunit, configured to broadcast second scheduling information and second data information to another terminal device by using a second time-frequency resource and a second antenna polarization direction; where the first time-frequency resource is different from the second time-frequency resource, and the first antenna polarization direction is the same as or different from the second antenna polarization direction.

In a possible design, the obtaining unit is configured to:

receive a scheduling instruction sent by a network device, where the scheduling instruction includes the time-frequency resource and the antenna polarization direction that are allocated for the communicative connection between the terminal device and the another terminal device, and time-frequency resources and/or antenna polarization directions that are allocated to any two terminal devices to communicatively connect to other terminals are different.

In a possible design, the sending unit is configured to:

before the scheduling instruction sent by the network device is received, send a terminal capability to the network device, where the terminal capability includes at least an antenna polarization capability of the terminal; and send, to the network device, a communication request for communicating with the another terminal device, so that the network device allocates the time-frequency resource and the antenna polarization direction for the communicative connection between the terminal device and the another terminal device based on the antenna polarization capability of the terminal.

In a possible design, the obtaining unit is configured to:

obtain information about a used resource occupied by a surrounding terminal, where the information about the used resource is used to indicate a time-frequency resource and an antenna polarization direction that have been occupied for communication; and select, based on the information about the used resource, the time-frequency resource and the antenna polarization direction for communicating with the another terminal device, where at least one of the selected time-frequency resource and the selected antenna polarization direction is different from the time-frequency resource and the antenna polarization direction that are occupied by the surrounding terminal.

In a possible design, the obtaining unit is configured to:

receive scheduling information sent by the surrounding terminal; and obtain, based on the scheduling information, the information about the used resource occupied by the surrounding terminal.

In a possible design, the obtaining unit is configured to:

demodulate the scheduling information to obtain the information about the used resource corresponding to a communication resource occupied by the surrounding terminal to send data information.

In a possible design, the obtaining unit is configured to:

demodulate the scheduling information in a preset spatial multiplexing detection manner, to obtain the antenna polarization direction and the time-frequency resource used to carry the data information that are in the scheduling information; and/or demodulate the scheduling information in a preset non-spatial multiplexing detection manner, to obtain the antenna polarization direction and the time-frequency resource used to carry the data information that are in the scheduling information.

According to a fifth aspect, this application provides a network device, including:

an allocation unit, configured to allocate a time-frequency resource and an antenna port for a communicative connection between a terminal device and another terminal device, where each antenna port is corresponding to an antenna polarization direction, and time-frequency resources and/or antenna polarization directions that are allocated to any two terminal devices to communicatively connect to other terminal devices are different; and a sending unit, configured to send the allocated time-frequency resource and antenna polarization direction to the terminal device by using a scheduling instruction.

In a possible design, the allocation unit is configured to:

receive a communication request for communicatively connecting to the another terminal device that is sent by the terminal device;

receive a terminal capability sent by the terminal device, where the terminal capability includes at least an antenna polarization capability of the terminal; and allocate the time-frequency resource and the antenna polarization direction for the communicative connection between the terminal device and the another terminal device based on the antenna polarization capability of the terminal.

In a possible design, the allocation unit is configured to:

allocate a first time-frequency resource and a first antenna polarization direction for a communicative connection between a first terminal device and another terminal device; and allocate a second time-frequency resource and a second antenna polarization direction for a communicative connection between the first terminal device and another terminal device; where the first time-frequency resource is the same as or partially the same as the second time-frequency resource, and the first antenna polarization direction is different from the second antenna polarization direction.

In a possible design, the first antenna polarization direction is orthogonal to the second antenna polarization direction.

In a possible design, the allocation unit is configured to:
allocate a first time-frequency resource and a first antenna polarization direction for a communicative connection between a first terminal device and another terminal device; and
allocating a second time-frequency resource and a second antenna polarization direction for a communicative connection between a second terminal device and another terminal device; where
the first time-frequency resource is different from the second time-frequency resource, and the first antenna polarization direction is the same as or different from the second antenna polarization direction.

According to a sixth aspect, this application provides a terminal device, including:
a receiving unit, configured to receive scheduling information sent by another terminal device; and
a processing unit, configured to obtain, based on the scheduling information, information about a resource used to carry data information, where the resource information is used to indicate a time-frequency resource and an antenna port used for communication; where
each antenna port is corresponding to an antenna polarization direction, and time-frequency resources and/or antenna polarization directions that are used by the terminal device to receive scheduling information sent by any two other terminal devices are different.

In a possible design, the receiving unit is configured to:
receive first scheduling information sent by a first terminal device by using a first time-frequency resource and a first antenna polarization direction; and
receive second scheduling information sent by a second terminal device by using a second time-frequency resource and a second antenna polarization direction; where
the first time-frequency resource is the same as or partially the same as the second time-frequency resource, and the first antenna polarization direction is different from the second antenna polarization direction.

In a possible design, the first antenna polarization direction is orthogonal to the second antenna polarization direction.

In a possible design, the receiving unit is configured to:
receive first scheduling information sent by a first terminal device by using a first time-frequency resource and a first antenna polarization direction; and
receive second scheduling information sent by a second terminal device by using a second time-frequency resource and a second antenna polarization direction; where
the first time-frequency resource is different from the second time-frequency resource, and the first antenna polarization direction is the same as or different from the second antenna polarization direction.

In a possible design, the processing unit is configured to:
demodulate the scheduling information, obtain the antenna polarization direction and the time-frequency resource used to carry the data information, and obtain, based on the time-frequency resource, the data information sent by the another terminal device.

In a possible design, the processing unit is configured to:
demodulate the scheduling information in a preset spatial multiplexing detection manner, to obtain the antenna polarization direction and the time-frequency resource used to carry the data information that are in the scheduling information; and/or
demodulate the scheduling information in a preset non-spatial multiplexing detection manner, to obtain the antenna polarization direction and the time-frequency resource used to carry the data information that are in the scheduling information.

According to a seventh aspect, this application provides a computer-readable storage medium, including an instruction. When the instruction is run on a computer, the computer is enabled to perform the method according to the first aspect.

According to an eighth aspect, this application provides a computer-readable storage medium, including an instruction. When the instruction is run on a computer, the computer is enabled to perform the method according to the second aspect.

According to a ninth aspect, this application provides a computer-readable storage medium, including an instruction. When the instruction is run on a computer, the computer is enabled to perform the method according to the third aspect.

According to a tenth aspect, this application provides a program product, for example, a computer-readable storage medium, which includes the program in the seventh aspect.

According to an eleventh aspect, this application provides a program product, for example, a computer-readable storage medium, which includes the program in the eighth aspect.

According to a twelfth aspect, this application provides a program product, for example, a computer-readable storage medium, which includes the program in the ninth aspect.

According to a thirteenth aspect, this application provides a computer program product that includes an instruction. When the computer program product is run on a computer, the computer is enabled to perform the methods in the foregoing aspects.

According to a fourteenth aspect, this application provides a computer-readable storage medium, and the computer-readable storage medium stores an instruction. When the instruction is run on a computer, the computer is enabled to perform the methods in the foregoing aspects.

It can be learned that, in the foregoing aspects, a multi-antenna port selection mechanism is introduced in a process of communication between the terminal device and another terminal, and the network device can schedule and specify a corresponding time-frequency resource and transmit antenna port, or the terminal device can freely contend for a corresponding time-frequency resource and transmit antenna port, so that terminal devices using different transmit antenna ports can use a same time-frequency resource, or terminal devices using a same transmit antenna port can use different time-frequency resources. After an antenna polarization selection mechanism is introduced, an optional dimension of resource information is increased (a space dimension is added to original time and frequency dimensions), thereby increasing an overall system communication capacity. This helps alleviate a conflict between limited system bandwidth and high-density services, reduce an information latency, and ensure stability and reliability of communication information transmission.

DESCRIPTION OF EMBODIMENTS

Figure 1:
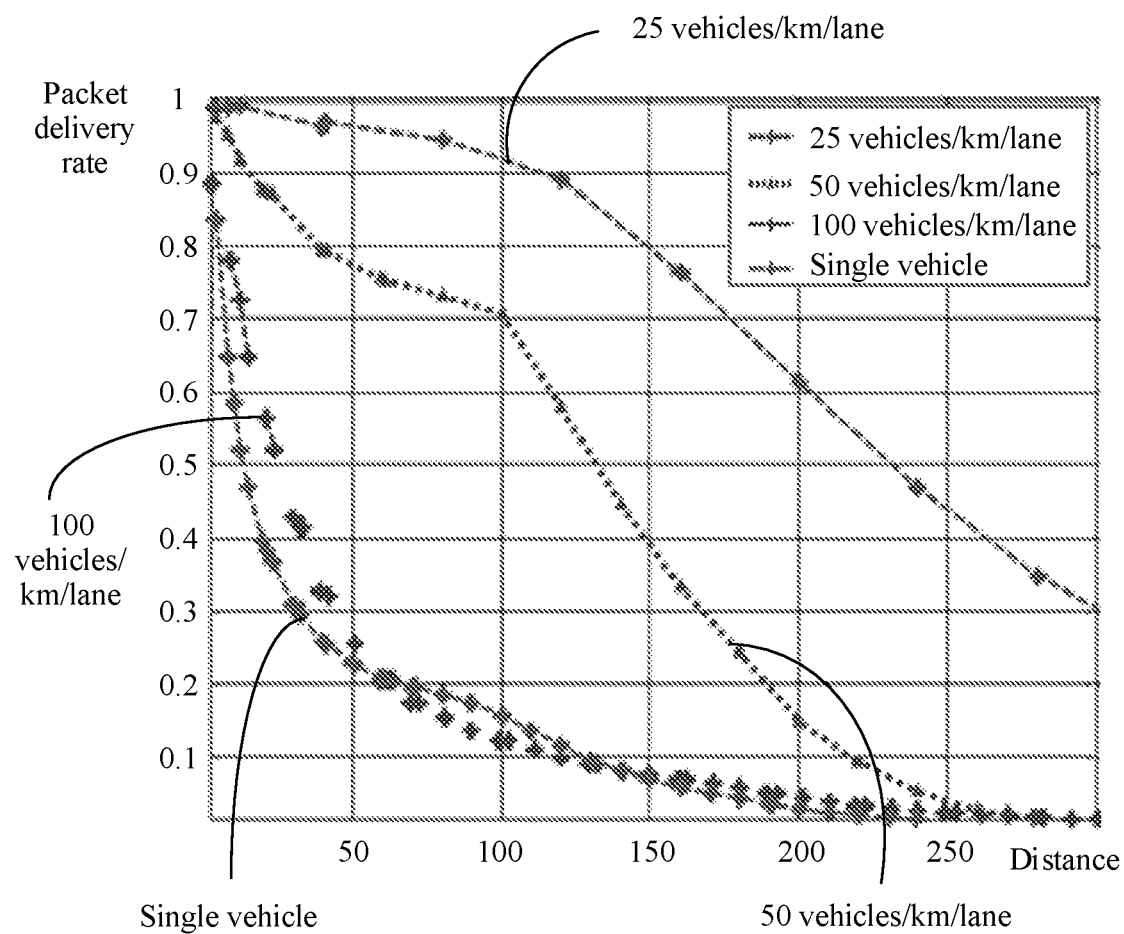
FIG. 1 shows curves of communication capacity performance obtained when 802.11p is used for communication according to an embodiment of this application.

This application is applied to a 5G communications system or another system that may appear in the future. The following describes some terms in this application, so as to facilitate understanding by a person skilled in the art. It should be noted that a name of a terminal device and a name of a network device may change when the solutions in the embodiments of this application are applied to the 5G system or another system that may appear in the future, but this does not affect implementation of the solutions in the embodiments of this application.

(1) A terminal device is also referred to as a terminal or user equipment, and is a device that provides a user with voice and/or data connectivity, for example, a handheld device with a wireless connection function, or an in-vehicle device. Common terminal devices include, for example, a mobile phone, a tablet computer, a notebook computer, a palmtop computer, a mobile Internet device (mobile Internet device, MID), and a wearable device such as a smartwatch, a smart band, or a pedometer.

(2) A network device is also referred to as a radio access network (Radio Access Network, RAN) device, is a device that connects a terminal device and a wireless network, and includes network devices in various communications standards, for example, includes but is not limited to a base station, an evolved NodeB (evolved Node B, eNB), a radio network controller (radio network controller, RNC), a NodeB (Node B, NB), a base station controller (Base Station Controller, BSC), a base transceiver station (Base Transceiver Station, BTS), a home eNodeB (Home evolved NodeB or Home Node B, HNB), and a baseband unit (BaseBand Unit, BBU).

(3) "A plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The present disclosure relates to the field of communications technologies. With continuous progress of science and technology, a car has become a widely used means of transport nowadays. In a large background of the Internet of Things, with the rise of concepts such as the Internet of Vehicles and an intelligent transportation system (Intelligent Transportation System, ITS for short) and related industries, a communications pipeline technology related to vehicle to vehicle (Vehicle to Vehicle, V2V for short) communication becomes one of research hotspots. In the prior art, a vehicle broadcasts, to a surrounding vehicle based on a 802.11p system or an LTE-V system by using a V2V network, information such as a vehicle speed, a driving direction, and a specific location of the vehicle, and whether an emergency brake is applied to the vehicle; and meanwhile, the vehicle obtains such information of another vehicle, so as to better perceive a traffic status beyond a visual range, thereby allowing a driver or an auxiliary/autonomous driving system of the vehicle to determine a danger or another situation in advance and make avoidance accordingly, or to perform some collaborative traffic behaviors.

During specific application, 802.11p uses the contention-based Carrier Sense Multiple Access/collision avoidance (Carrier Sense Multiple Access/collision avoidance, CSMA/CA for short) protocol, in which each terminal autonomously contends for a frequency resource randomly. Although this mechanism is flexible and convenient for networking, when there are a large quantity of vehicles, a collision probability is greatly increased, and the terminal can hardly obtain a resource through contention to send a message in time, which causes a message latency and greatly reduces reliability.

However, different from a working principle of the asynchronous 802.11p system, LTE-V is a synchronization system with a same synchronization source, and has two working modes: a free contention mode and a network scheduling mode. In the free contention mode, a sensing/reservation (sensing/reservation) mechanism is used, collisions between users are alleviated through sensing and detection, and a plurality of periodic time-frequency resources can be preempted at one time through resource reservation. This mechanism has a same problem as the CSMA/CA, that is, efficiency is quite low when there are a large quantity of vehicles. However, by comparison, an advantage of LTE-V lies in that when overall network performance is reduced due to resource shortage, a base station may perform scheduling in a centralized manner, for example, may reduce message sending frequency of all vehicles in a specific area, to reduce a collision probability. However, this is a compromise between performance and capacity. In the network scheduling mode, resource allocation for all terminal devices is completed by the base station through scheduling. Because there is a network node that coordinates and optimizes behavior of all terminal devices, system efficiency can be significantly improved, and theoretically, optimal attainable system performance can be achieved while a resource constraint condition is met. When resources and users are in severe conflict, a part of performance needs to be sacrificed to reach a compromise between performance and capacity. Therefore, in a V2V network, a conflict between limited system bandwidth and high-density services is still present and prominent.

Figure 2:
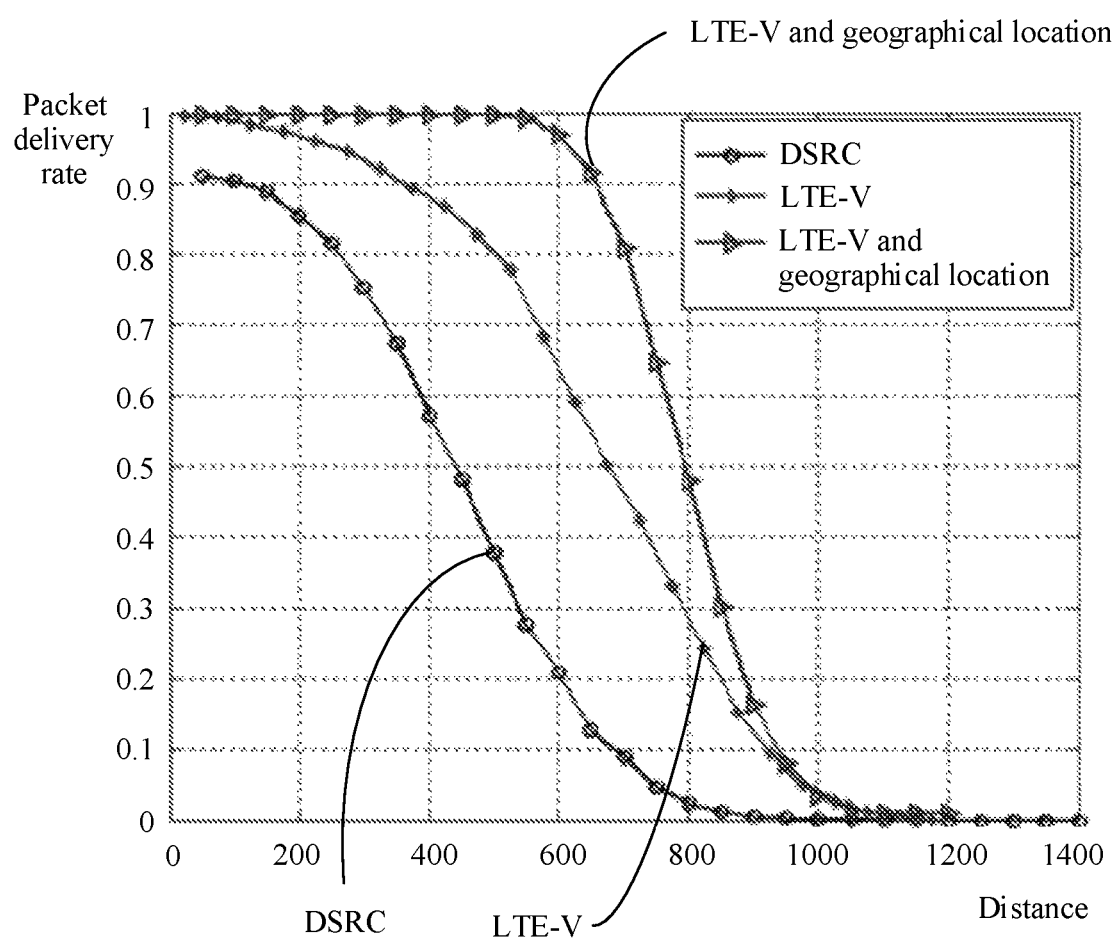
FIG. 2 shows curves of communication capacity performance obtained when LTE-V is used for communication according to an embodiment of this application.

As shown in FIG. 1, in simulation curves of communication capacity performance obtained when 802.11P is used for communication, in a case of 50 vehicles per kilometer per lane, a distance between vehicles with 90% reliable communication is far less than 50 m, and in this case, correct sending of a safety message is seriously affected. It can be learned from FIG. 2 that, in simulation curves of communication capacity performance obtained when LTE-V is used for communication, although communication is performed with reference to LTE-V base station scheduling and a geographic location—based scheduling policy, and the communication capacity performance is improved compared with that of 802.11P, a system capacity bottleneck still exists in a scenario in which there are a large quantity of vehicles.

Figure 3:
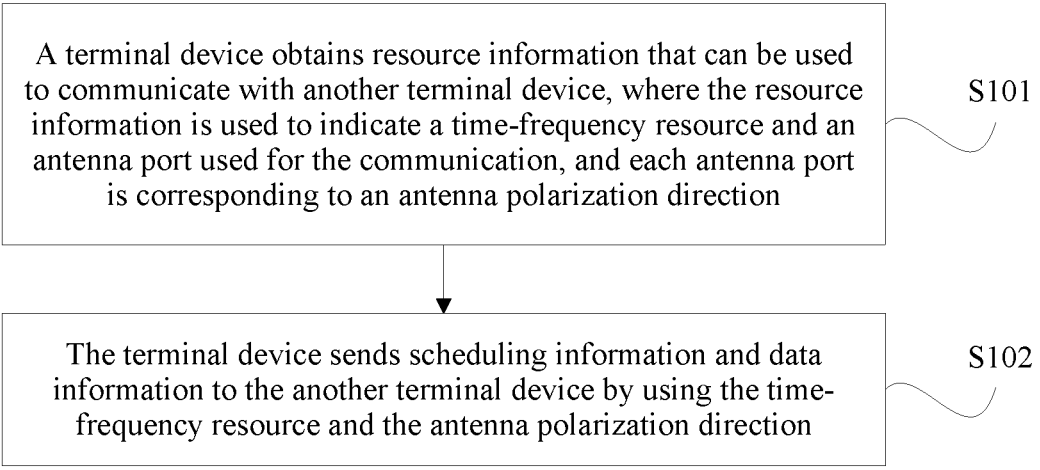
FIG. 3 is a first schematic flowchart of a data exchange method according to an embodiment of this application.

Therefore, to overcome the problem that a conflict between limited system bandwidth and high-density services is still present and prominent in the prior art, the present disclosure provides a data exchange method. The data exchange method may be executed by the foregoing terminal device. Referring to FIG. 3, the method includes the following steps.

S101. A terminal device obtains resource information that can be used to communicate with another terminal device, where the resource information is used to indicate a time-frequency resource and an antenna port used for the communication, and each antenna port is corresponding to an antenna polarization direction.

In the present disclosure, a quantity of terminal devices and a quantity of other terminal devices may be one or more, and a terminal type of the foregoing terminal device may be the same as or different from a terminal type of the another terminal device. For example manners in which the terminal device obtains the resource information, an implementable manner is as follows: A third terminal device may determine, by analyzing some parameters, the resource information that can be used by the terminal device to communicate with the another terminal device, and then the third terminal device sends the determined resource information to the terminal device, so that the terminal device can receive the foregoing resource information, where a device type of the third terminal device may be the same as or different from a type of the foregoing terminal device or a type of the another terminal device. Another implementable manner is as follows: The terminal device may directly obtain, through analysis and processing on some parameters, the resource information that can be used by the terminal device to communicate with another terminal device. It should be noted that the foregoing time-frequency resource includes time domain resource information and frequency domain resource information. In one implementation, the foregoing antenna port may be corresponding to at least one of the following: an antenna polarization direction, an antenna reference symbol sequence, or an antenna reference pattern.

S102. The terminal device sends scheduling information and data information to another terminal device by using the time-frequency resource and the antenna polarization direction.

The scheduling information includes the antenna polarization direction and the time-frequency resource used to carry the data information, and time-frequency resources and/or antenna polarization directions that are used by any two terminal devices to send scheduling information and data information to other terminal devices are different.

Because there may be one or more terminal devices and one or more other terminal devices, when there is a relatively large quantity of terminal devices, to alleviate a communication conflict that occurs when a plurality of terminal devices communicate with other terminal devices, each of the plurality of terminal devices may be set to send scheduling information and data information to another terminal device by using the foregoing obtained time-frequency resource and antenna polarization direction. It should be noted that, in some example cases, a plurality of terminal devices may communicate with other terminal devices by using different resource information. The different resource information may include: different time-frequency resources used by two terminal devices and/or different antenna polarization directions used by the two terminal devices. In this way, a communication capacity of an entire communications system can be improved, and it helps alleviate the conflict between limited system bandwidth and high-density services, reduce an information latency, and improve communication reliability.

According to the data exchange method in accordance with the disclosure, when a plurality of terminal devices communicate with other terminal devices, and after the terminal device obtains the resource information used for communication, the terminal device may communicate with the another terminal device by using the foregoing resource information. Because the resource information is used to indicate the time-frequency resource and the antenna port for communication, and each antenna port is corresponding to an antenna polarization direction, during communication, different terminal devices may use partially the same resource information, so as to improve the communication capacity of the entire system in a spatial multiplexing gain manner. It helps alleviate the conflict between limited system bandwidth and high-density services, reduce the information latency, and improve the communication reliability, thereby improving practicability of the method.

It can be learned from the foregoing description that, after the terminal device determines the resource information used to communicate with the another terminal device, because the resource information is used to indicate the time-frequency resource and the antenna polarization direction for communication, the terminal device can send the scheduling information and the data information to the another terminal by using the foregoing time-frequency resource and the antenna polarization direction, where the scheduling information includes the antenna polarization direction and the time-frequency resource that carries the sent data information, so that the another terminal device can learn the resource information used when the terminal device communicates with the another terminal device, and when the another terminal device needs to communicate with a third terminal device, the another terminal device may select resource information that is different from the foregoing used resource information for a communicative connection. In addition, when the terminal device is an in-vehicle device, the foregoing data information may include information such as a vehicle speed, a driving direction, a specific location, and whether an emergency brake is applied. When the terminal device is a wearable device, the foregoing data information may include location information of a user, a movement track of the user, status information of the user, and the like.

It should be noted that, when the terminal device sends the scheduling information and the data information to the another terminal device by using the time-frequency resource and the antenna polarization direction, to alleviate a communication conflict of a plurality of terminal devices, time-frequency resources and antenna polarization directions used by any two terminal devices to send scheduling information and data information to other terminal devices need to be set to be different. The difference herein may include: Time-frequency resources used by any two terminal devices are different, antenna polarization directions used by any two terminal devices are different, and both time-frequency resources and antenna polarization directions used by any two terminal devices are different. Alternatively, under a specific condition (for example, when a distance between terminal devices is long enough), time-frequency resources and antenna polarization directions used by any two terminal devices to send scheduling information and data information to other terminal devices may be the same. In this case, within an effective communication distance, mutual interference between two different terminal devices that use a same time-frequency resource and antenna polarization direction is relatively small. An example in which the terminal device includes a first terminal device and a second terminal device is used for description, and a first implementable manner of sending the scheduling information and the data information by using the obtained resource information is as follows:

the first terminal device broadcasts first scheduling information and first data information to another terminal device by using a first time-frequency resource and a first antenna polarization direction; and the second terminal device broadcasts second scheduling information and second data information to another terminal device by using a second time-frequency resource and a second antenna polarization direction; where the first time-frequency resource is the same as or partially the same as the second time-frequency resource, and the first antenna polarization direction is different from the second antenna polarization direction.

For the foregoing first antenna polarization direction and second antenna polarization direction that are different, an implementable manner is as follows: The first antenna polarization direction is orthogonal to the second antenna polarization direction. In this case, communication between the terminal devices and other terminal devices has a relatively good effect. For example, the foregoing antenna polarization direction is related to a hardware structure of the terminal device. Generally, after the hardware structure of the terminal device is determined, the antenna polarization direction of the terminal device is unique and unchanged. However, specific direction angles of the foregoing first antenna polarization direction and second antenna polarization direction are not intended to be limiting. For example, a linear polarization antenna may be used, the first antenna polarization direction is set to +45°, and the second antenna polarization direction may be −45°; or the first antenna polarization direction may be set to +90° (vertical polarization), and the second antenna polarization direction may be 0° (horizontal polarization); or the first antenna polarization direction may be set to +60° (normal polarization), and the second antenna polarization direction may be −30° (normal polarization). Certainly, the foregoing specific angle values of the first antenna polarization direction and the second antenna polarization direction are merely used as an example for description. In specific application, other angle values may be used. In addition to the linear polarization antenna, there is also a circular polarization antenna (left-hand polarization and right-hand polarization), provided that the first antenna polarization direction is orthogonal to the second antenna polarization direction. Because the first time-frequency resource is the same as or partially the same as the second time-frequency resource, and the first antenna polarization direction is orthogonal to the second antenna polarization direction, it is implemented that terminal devices using different antenna polarization directions use a same time-frequency resource or partially the same time-frequency resources to communicate with other terminal devices, so that two different terminal devices form a virtual-MIMO (virtual-MIMO, VMIMO for short) user pair.

Further, in a V2V network, the foregoing terminal device may be a vehicle, and the foregoing data exchange method may be implemented based on an LTE-V system, thereby facilitating successful pairing of a virtual MIMO user pair. Specifically, the LTE-V is a synchronization system. When a plurality of terminal devices need to communicate with other terminal devices, the terminal devices have same physical layer timing, so that a condition of using the VMIMO technology is met. Therefore, an existing system capacity can be increased by using the MIMO technology at relatively low costs without changing a transceiver specification of the terminal device (for example, a currently popular 1T2R configuration) and without significantly increasing terminal device costs. Another advantage of introducing the VMIMO technology in the V2V network is that for a terminal device in V2V, transceiver antennas are deployed on different terminal devices and are relatively far away from each other, which helps reduce correlation between the antennas. In addition, because a deployment height of an omni-directional antenna is low, it is easy to form a multipath channel through reflection of an object such as a surrounding building. All the foregoing cases are conducive to successful pairing of VMIMO.

However, the V2V network uses a broadcast communication manner. Power of signals from VMIMO paired users to each device in other terminal devices may be relatively different. that is, a near-far effect is obvious. In this case, a problem of interference between strong and weak received signals is prominent, and in particular, impact on the weak received signal is greater. In addition, in an application scenario (for example, a high-speed road or a suburban road with a relatively large open field nearby) in which there are few reflecting objects nearby and there are a relatively large quantity of line of sight (line of sight, LOS for short) paths between terminal devices (that is, vehicles), signals are mainly transmitted along direct paths. In this case, channel correlation between VMIMO spatial multiplexing users may be relatively high, and inter-user interference is relatively high. Therefore, a transmit antenna polarization selection mechanism is introduced into a V2V communication link, which helps reduce correlation between VMIMO multiplexing terminal devices, so that even in an application scenario in which LOS propagation is dominant, terminal devices that occupy a same time-frequency resource may be distinguished in a spatial dimension according to antenna polarization directions introduced.

The first terminal device and the second terminal device are set to communicatively connect to other terminal devices by using different antenna polarization directions respectively and using a same time-frequency resource or partially the same time-frequency resources, so that a communication conflict between the first terminal device and the second terminal device can be effectively alleviated, thereby reducing an information transmission latency and ensuring stability and reliability of communication information transmission.

In addition, when the terminal device includes the first terminal device and the second terminal device, and the first terminal device and the second terminal device need to separately communicate with another terminal device, a second implementable manner of sending the scheduling information and the data information by using the obtained resource information is as follows:

the first terminal device broadcasts first scheduling information and first data information to another terminal device by using a first time-frequency resource and a first antenna polarization direction; and the second terminal device broadcasts second scheduling information and second data information to another terminal device by using a second time-frequency resource and a second antenna polarization direction; where the first time-frequency resource is different from the second time-frequency resource, and the first antenna polarization direction is the same as or different from the second antenna polarization direction.

In one implementation, because the first terminal device and the second terminal device broadcast scheduling information and data information to other terminal devices by using different time-frequency resources respectively, communication between the first terminal device and another terminal device and communication between the second terminal device and another terminal device do not conflict. In this case, the first antenna polarization direction used by the first terminal device may be set to be the same as the second antenna polarization direction used by the second terminal device. In some other embodiments, the first antenna polarization direction used by the first terminal device may be set to be different from the second antenna polarization direction used by the second terminal device. For example, the first antenna polarization direction is orthogonal to the second antenna polarization direction.

The first terminal device and the second terminal device are set to communicatively connect to other terminal devices by using the same or different antenna polarization directions and different time-frequency resources respectively, so that there is no mutual interference between the first terminal device and the second terminal device, and setting diversity of communication manners between terminal devices is effectively increased. However, the foregoing terminal devices do not form a virtual MIMO user pair.

It should be noted that, when the terminal device includes the first terminal device and the second terminal device, and the first terminal device and the second terminal device need to separately communicate with another terminal device, a third implementable manner of sending the scheduling information and the data information by using the obtained resource information is as follows:

the first terminal device broadcasts first scheduling information and first data information to another terminal device by using a first time-frequency resource and a first antenna polarization direction; and the second terminal device broadcasts second scheduling information and second data information to another terminal device by using a second time-frequency resource and a second antenna polarization direction; where when a distance between the first terminal device and the second terminal device is greater than or equal to a preset distance threshold, the first time-frequency resource is the same as or different from the second time-frequency resource, and the first antenna polarization direction is the same as or different from the second antenna polarization direction.

When the distance between the first terminal device and the second terminal device is long enough, communication between the first terminal device and another terminal device does not affect communication between the second terminal device and another terminal device. Therefore, time-frequency resources and antenna polarization directions that are used by the first terminal device and the second terminal device may be the same or different. For example, the distance threshold is 500 m, and the distance between the first terminal device and the second terminal device is 700 m. Because 700 m>500 m, in this case, the distance between the first terminal device and the second terminal device is long enough, and signals of the first terminal device and the second terminal device do not interfere with each other. It should be noted that the foregoing distance threshold is merely used as an example for description, and the distance threshold may be set to another specific value in specific application. Therefore, resource information used by the first terminal device may be the same as or different from resource information used by the second terminal device. In other words, the first time-frequency resource is the same as or different from the second time-frequency resource, and the first antenna polarization direction is the same as or different from the second antenna polarization direction.

When the distance between the first terminal device and the second terminal device is long enough, communication performed by the first terminal device and communication performed by the second terminal device do not conflict with each other. Therefore, the first terminal device and the second terminal device may be set to communicatively connect to other terminal devices by using the same or different antenna polarization directions and the same or different time-frequency resources respectively.

It can be learned from the foregoing description that, to further understand example technical solutions in accordance with the disclosure, the following gives description by using a case in which each antenna port corresponds to an antenna polarization direction, and an antenna reference symbol sequence or an antenna reference pattern, that is, each antenna port is corresponding to an antenna polarization direction and an antenna reference symbol sequence, or each antenna port is corresponding to an antenna polarization direction and an antenna reference pattern. In this case, for the terminal device, the obtained resource information is used to indicate a time-frequency resource, an antenna polarization direction, and an antenna reference symbol sequence or an antenna reference pattern for performing communication. A manner in which the terminal device can communicate with another terminal device by using the resource information includes:

the terminal device sends scheduling information and data information to the another terminal device by using the time-frequency resource, the antenna polarization direction, and the antenna reference symbol sequence or the antenna reference pattern; where The scheduling information includes the antenna polarization direction, the antenna reference symbol sequence or the antenna reference pattern, and the time-frequency resource used to carry the data information. Time-frequency resources, antenna polarization directions, and antenna reference symbol sequences or antenna reference patterns used by any two terminal devices to send scheduling information and data information to other terminal devices are the same or different.

After the terminal device determines the resource information for communicating with the another terminal device, because the resource information is used to indicate the time-frequency resource, the antenna polarization direction, and the antenna reference symbol sequence or the antenna reference pattern used for the communication, the terminal device may broadcast the scheduling information and the data information to the another terminal by using the foregoing time-frequency resource, the antenna polarization direction, and the antenna reference symbol sequence or the antenna reference pattern. The scheduling information includes the antenna polarization direction, the antenna reference symbol sequence or the antenna reference pattern, and the time-frequency resource used to carry the sent data information. Therefore, the another terminal device can learn the resource information used when the terminal device communicates with the another terminal device, and when the another terminal device needs to communicate with a third terminal device, the another terminal device can select resource information different from the foregoing used resource information for the communicative connection. For specific content of the data information, when the terminal device is an in-vehicle device, the foregoing data information may include information such as a vehicle speed, a driving direction, a specific location, and whether an emergency brake is applied. When the terminal device is a wearable device, the foregoing data information may include location information of a user, a movement track of the user, status information of the user, and the like.

It should be noted that, when the terminal device sends the scheduling information and the data information to the another terminal device by using the time-frequency resource, the antenna polarization direction, and the antenna reference symbol sequence or the antenna reference pattern, to alleviate a communication conflict caused when a plurality of terminal devices communicate with other terminal devices, time-frequency resources, antenna polarization directions, and antenna reference symbol sequences or antenna reference patterns that are used by any two terminal devices to send scheduling information and data information to other terminal devices need to be set to be different. The difference herein is that at least one of the three parameters in resource information used by any two terminal devices is different. In some other embodiment, under a specific condition (when a distance between terminal devices is long enough), time-frequency resources, antenna polarization directions, and antenna reference symbol sequences or antenna reference patterns that are used by any two terminal devices to send scheduling information and data information to other terminal devices may be set to be the same. In this case, for the two different terminal devices that use the same time-frequency resources, antenna polarization directions, and antenna reference symbol sequences or antenna reference patterns, communication performed by one terminal device and communication performed by the other terminal device do not affect each other. In some embodiments, that the terminal device includes a first terminal device and a second terminal device is used as an example for description. When the first terminal device and the second terminal device need to separately communicate with another terminal device, a first implementable manner of sending the scheduling information and the data information by using the obtained resource information is as follows:

the first terminal device broadcasts first scheduling information and first data information to another terminal device by using a first time-frequency resource, a first antenna polarization direction, and a first antenna reference symbol sequence or a first antenna reference pattern; and the second terminal device broadcasts second scheduling information and second data information to another terminal device by using a second time-frequency resource, a second antenna polarization direction, and a second antenna reference symbol sequence or a second antenna reference pattern; where the first time-frequency resource is the same as or partially the same as the second time-frequency resource, the first antenna polarization direction is different from the second antenna polarization direction, and the first antenna reference symbol sequence is different from the second antenna reference symbol sequence, or the first antenna reference pattern is different from the second antenna reference pattern.

A manner of implementing "the first antenna polarization direction is different from the second antenna polarization direction, and the first antenna reference symbol sequence is different from the second antenna reference symbol sequence, or the first antenna reference pattern is different from the second antenna reference pattern" is as follows: The first antenna polarization direction is orthogonal to the second antenna polarization direction, and the first antenna reference symbol sequence is orthogonal to the second antenna reference symbol sequence, or the first antenna reference pattern is orthogonal to the second antenna reference pattern.

It should be noted that the first terminal device and the second terminal device may separately broadcast scheduling information and data information to another terminal device by using a time-frequency resource, an antenna polarization direction, and an antenna reference symbol sequence, or the first terminal device and the second terminal device may separately broadcast scheduling information and data information to another terminal device by using a time-frequency resource, an antenna polarization direction, and an antenna reference pattern. In other words, the foregoing antenna reference pattern and the antenna reference symbol sequence cannot be used as reference data at the same time. In some embodiments, the first time-frequency resource is the same as or partially the same as the second time-frequency resource, the first antenna polarization direction is orthogonal to the second antenna polarization direction, and correspondingly the first antenna reference symbol sequence is orthogonal to the second antenna reference symbol sequence, or the first antenna reference pattern is orthogonal to the second antenna reference pattern, so that the terminal devices using different antenna polarization directions and different antenna reference symbol sequences or different antenna reference patterns use a same time-frequency resource or partially the same time-frequency resources to communicate with other terminal devices, thereby effectively improving quality of communication between the first terminal device and another terminal device and quality of communication between the second terminal device and another terminal device.

The first terminal device and the second terminal device are set to communicatively connect to other terminal devices by using different antenna polarization directions, and different antenna reference symbol sequences or different antenna reference patterns respectively, and using a same time-frequency resource or partially the same time-frequency resources, so that a conflict between the communication performed by the first terminal device and the communication performed by the second terminal device can be effectively alleviated, and stability and reliability of communication information transmission can be ensured.

In addition, when the terminal device includes the first terminal device and the second terminal device, and the first terminal device and the second terminal device need to separately communicate with another terminal device, a second implementable manner of sending the scheduling information and the data information by using the obtained resource information is as follows:

the first terminal device broadcasts first scheduling information and first data information to another terminal device by using a first time-frequency resource, a first antenna polarization direction, and a first antenna reference symbol sequence or a first antenna reference pattern; and the second terminal device broadcasts second scheduling information and second data information to another terminal device by using a second time-frequency resource, a second antenna polarization direction, and a second antenna reference symbol sequence or a second antenna reference pattern; where the first time-frequency resource is different from the second time-frequency resource, the first antenna polarization direction is the same as or different from the second antenna polarization direction, and the first antenna reference symbol sequence is the same as or different from the second antenna reference symbol sequence, or the first antenna reference pattern is the same as or different from the second antenna reference pattern.

In one implementation, because the first terminal device and the second terminal device broadcast scheduling information and data information to other terminal devices by using different time-frequency resources respectively, communication between the first terminal device and another terminal device and communication between the second terminal device and another terminal device do not conflict. In this case, the first antenna polarization direction and the second antenna polarization direction may be set to be the same; and correspondingly, the first antenna reference symbol sequence and the second antenna reference symbol sequence may be set to be the same, or the first antenna reference pattern and the second antenna reference pattern may be set to be the same. Alternatively, the first antenna polarization direction and the second antenna polarization direction may be set to be different. For example, the first antenna polarization direction is orthogonal to the second antenna polarization direction. Correspondingly, the first antenna reference symbol sequence and the second antenna reference symbol sequence may be set to be different, or the first antenna reference pattern and the second antenna reference pattern are set to be different.

The first terminal device and the second terminal device are set to communicatively connect to other terminal devices by using different time-frequency resources, and using the same or different antenna polarization directions, and the same or different antenna reference symbol sequences or antenna reference patterns respectively. Because time-frequency resources of different terminals are orthogonal, no collision or conflict occurs.

It should be noted that, when the terminal device includes the first terminal device and the second terminal device, and the first terminal device and the second terminal device need to separately communicate with another terminal device, a third implementable manner of sending the scheduling information and the data information by using the obtained resource information is as follows:

the first terminal device broadcasts first scheduling information and first data information to another terminal device by using a first time-frequency resource, a first antenna polarization direction, and a first antenna reference symbol sequence or a first antenna reference pattern; and the second terminal device broadcasts second scheduling information and second data information to another terminal device by using a second time-frequency resource, a second antenna polarization direction, and a second antenna reference symbol sequence or a second antenna reference pattern; where when a distance between the first terminal device and the second terminal device is greater than or equal to a preset distance threshold, the first time-frequency resource is the same as or different from the second time-frequency resource, the first antenna polarization direction is the same as or different from the second antenna polarization direction, and the first antenna reference symbol sequence is the same as or different from the second antenna reference symbol sequence, or the first antenna reference pattern is the same as or different from the second antenna reference pattern.

When the distance between the first terminal device and the second terminal device is long enough, communication between the first terminal device and another terminal device does not affect communication between the second terminal device and another terminal device. Therefore, time-frequency resources, antenna polarization directions, and antenna reference symbol sequences or antenna reference patterns that are used by the first terminal device and the second terminal device may be the same or different. For example, the distance threshold is 600 m, and the distance between the first terminal device and the second terminal device is 800 m. Because 800 m>600 m, that is, the distance between the first terminal device and the second terminal device is long enough, signals of the first terminal device and the second terminal device do not interfere with each other. It should be noted that the foregoing distance threshold is merely used as an example for description, and the distance threshold may be set to another specific value in specific application. Therefore, resource information used by the first terminal device may be the same as or different from resource information used by the second terminal device. In other words, the first time-frequency resource is the same as or different from the second time-frequency resource, the first antenna polarization direction is the same as or different from the second antenna polarization direction, and correspondingly, the first antenna reference symbol sequence is the same as or different from the second antenna reference symbol sequence, or the first antenna reference pattern is the same as or different from the second antenna reference pattern.

When the distance between the first terminal device and the second terminal device is long enough, communication performed by the first terminal device and communication performed by the second terminal device do not conflict with each other. Therefore, the first terminal device and the second terminal device may be set to communicatively connect to other terminal devices by using the same or different antenna polarization directions, the same or different time-frequency resources, and the same or different antenna reference symbol sequences or antenna reference patterns respectively.

Figure 4:
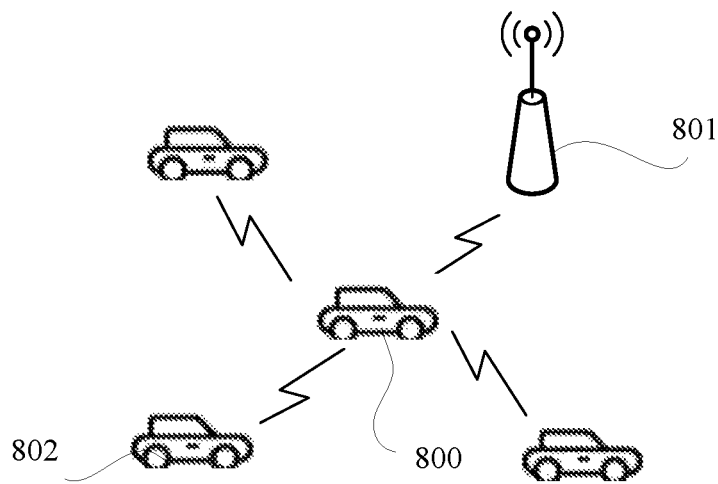
FIG. 4 is a schematic diagram of an organizational structure in application scenario 1 according to an embodiment of this application.

Application Scenario 1:

It can be learned from FIG. 4 that an organizational structure in application scenario 1 includes a plurality of terminal devices (for example, vehicles) and one network device 801 (for example, a base station). One terminal device 800 in the plurality of terminal devices is communicatively connected to the network device 801, and is configured to send data information to the network device 801, and the terminal device 800 is also communicatively connected to another terminal device 802 nearby. Specifically, the network device 801 may allocate corresponding resource information for communication between the terminal device 800 and the another terminal device 802 based on the sent data information. The allocated resource information needs to ensure that any two terminal devices 800 that communicatively connect to other terminal devices 802 do not conflict with each other in communication, so as to reduce correlation between different terminal devices 800 and reduce mutual interference.

The data exchange method is applied to the foregoing application scenario 1. It can be learned from FIG. 5 that a manner in which the terminal device can obtain the resource information that can be used to communicate with the another terminal device includes the following steps.

S00. The terminal device sends a terminal capability to a network device, where the terminal capability includes at least an antenna polarization capability of the terminal.

An antenna polarization capability of a terminal device is related to a hardware structure of the terminal device. Therefore, after the hardware structure of the terminal device is determined, the antenna polarization capability is also determined accordingly. The foregoing antenna polarization capability may include a quantity of transmit antennas, a quantity of receive antennas, and a polarization direction that can be supported. After obtaining the antenna polarization capability, the network device may allocate corresponding resource information to the terminal device based on the antenna polarization capability of the terminal device.

S01. The terminal device sends, to the network device, a communication request for communicating with the another terminal device, so that the network device allocates the time-frequency resource and the antenna port for the communicative connection between the terminal device and the another terminal device based on the antenna polarization capability of the terminal.

It should be noted that both steps S00 and S01 are an interaction process in which the terminal device sends information to the network device, and specific information sent includes the terminal capability and the communication request. It can be learned from the foregoing description that the terminal device may separately send the terminal capability and the communication request to the network device. It can be understood that in some specific scenarios, the terminal device may send the terminal capability and the communication request to the network device at the same time. In an implementable manner, the terminal device integrates the terminal capability into the communication request, and sends the communication request to the network device, so that the terminal capability and the communication request are sent by the terminal device to the network device at the same time.

S02. After completing allocation of the time-frequency resource and the antenna port for the communicative connection between the terminal device and the another terminal device, the network device may send the time-frequency resource and the antenna port to the terminal device by using a scheduling instruction.

In a network device scheduling mode, the network device allocates time-frequency resources and antenna ports to different terminal devices. In some embodiments, the network device may assign different antenna ports to the network devices, that is, allocate different antenna polarization directions to different terminal devices (for example, allocate orthogonal antenna polarization directions to different terminal devices). Certainly, the network device may further allocate orthogonal antenna reference symbol sequences or antenna reference patterns to different terminal devices.

Figure 6:
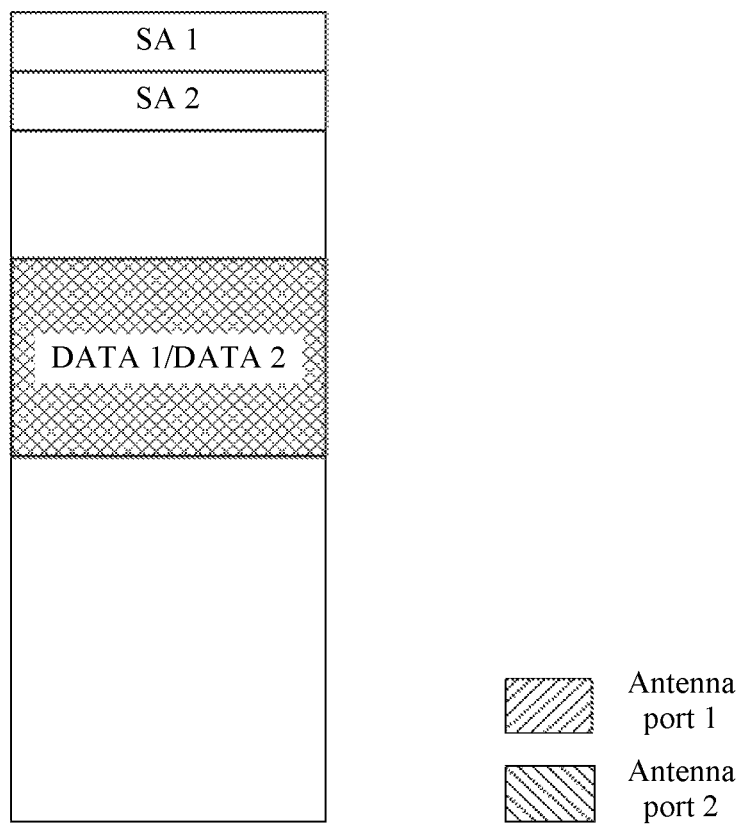
FIG. 6 is a structural diagram in which a plurality of terminal devices sends data information by multiplexing completely the same time-frequency resources and different antenna ports according to an embodiment of this application.
Figure 7:
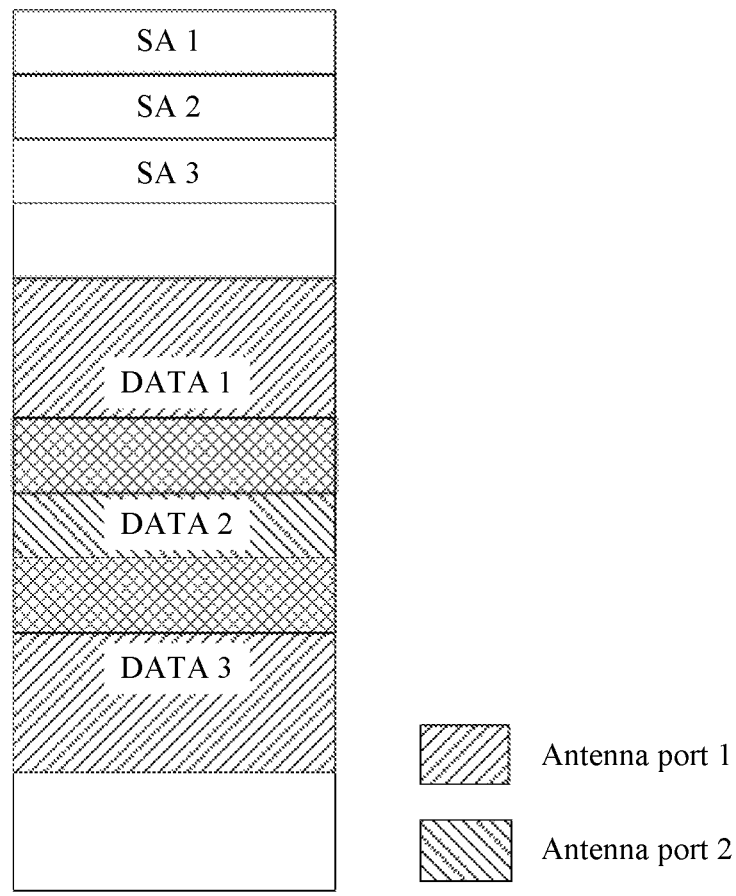
FIG. 7 is a structural diagram in which a plurality of terminal devices sends data information by multiplexing partially the same time-frequency resources and different antenna ports according to an embodiment of this application.

The network device may allocate time-frequency resources and antenna ports, so that a plurality of different terminal devices send DATA data by using different antenna ports (including antenna polarization directions, and antenna reference symbol sequences or antenna reference patterns) and multiplexing completely the same time-frequency resources (as shown in FIG. 6) or partially the same time-frequency resources (as shown in FIG. 7). Although scheduling information (Scheduling Assignment, SA for short) shown in the figure is sent not in a multi-user MIMO manner, SAs of a plurality of different terminal devices may actually be sent by spatially multiplexing a same time-frequency resource in a same manner. After determining the time-frequency resource and the antenna port that are allocated to the terminal device, the network device sends the foregoing allocated time-frequency resource and antenna port to the terminal device by using the scheduling instruction.

S03. The terminal device receives the scheduling instruction sent by the network device, where the scheduling instruction includes the time-frequency resource and the antenna port that are allocated for the communicative connection between the terminal device and the another terminal device, and time-frequency resources and antenna ports that are allocated to any two terminal devices to communicatively connect to other terminal devices are the same or different.

After receiving the scheduling instruction sent by the network device, the terminal device may communicatively connect to the another terminal device based on the allocated time-frequency resource and antenna port. It should be noted that, when a plurality of terminal devices need to communicate with other terminal devices, to alleviate a communication conflict, when the network device allocates a time-frequency resource and an antenna port to each terminal device, the following rule is met: Time-frequency resources and antenna ports that are allocated to any two terminal devices that communicatively connect to other terminal devices are the same or different. It should be noted that when a distance between the plurality of terminal devices is short enough, time-frequency resources and antenna ports that are allocated to any two terminal devices that communicatively connect to other terminal devices may be different. The difference herein may include: The time-frequency resources are different and/or the antenna ports are different. In this case, the antenna port may be corresponding to at least one of the following: an antenna polarization direction, an antenna reference symbol sequence, or an antenna reference pattern. When a distance between the plurality of terminal devices is long enough, time-frequency resources and antenna ports that are allocated to any two terminal devices that communicatively connect to other terminal devices may be the same.

According to the data exchange method in accordance with the disclosure, the terminal device obtains the scheduling instruction from the network device, where the scheduling instruction includes the time-frequency resource and the antenna port that are used by the terminal device to communicatively connect to the another terminal device, thereby improving accuracy and reliability of obtaining the time-frequency resource and the antenna port, ensuring stability and reliability of the communicative connection between the terminal device and the another terminal device, extending an application scope of the method, and improving practicability of the method.

Application Scenario 2

Figure 8:
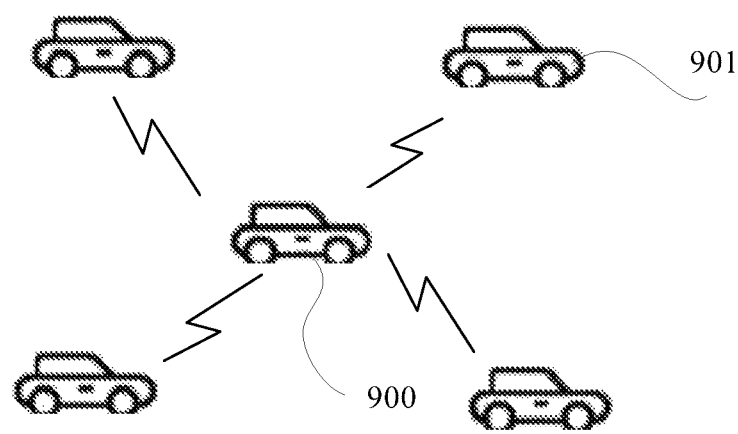
FIG. 8 is a schematic diagram of an organizational structure in application scenario 2 according to an embodiment of this application.

It can be learned from FIG. 8 that an organizational structure in application scenario 2 includes a terminal device 900 (for example, a vehicle) and a surrounding terminal 901 located around the terminal device. There is a communicative connection between the terminal device 900 and the surrounding terminal 901. Specifically, the surrounding terminal 901 sends data information to the terminal device 900, and the terminal device 900 analyzes the sent data information to determine a time-frequency resource and an antenna port that are used to communicate with another terminal device. In addition, when the communication is being performed by using the determined resource information, it needs to be ensured that any two terminal devices 900 that communicatively connect to other terminal devices do not conflict with each other in communication, so as to ensure security and reliability of information sending.

Figure 9:
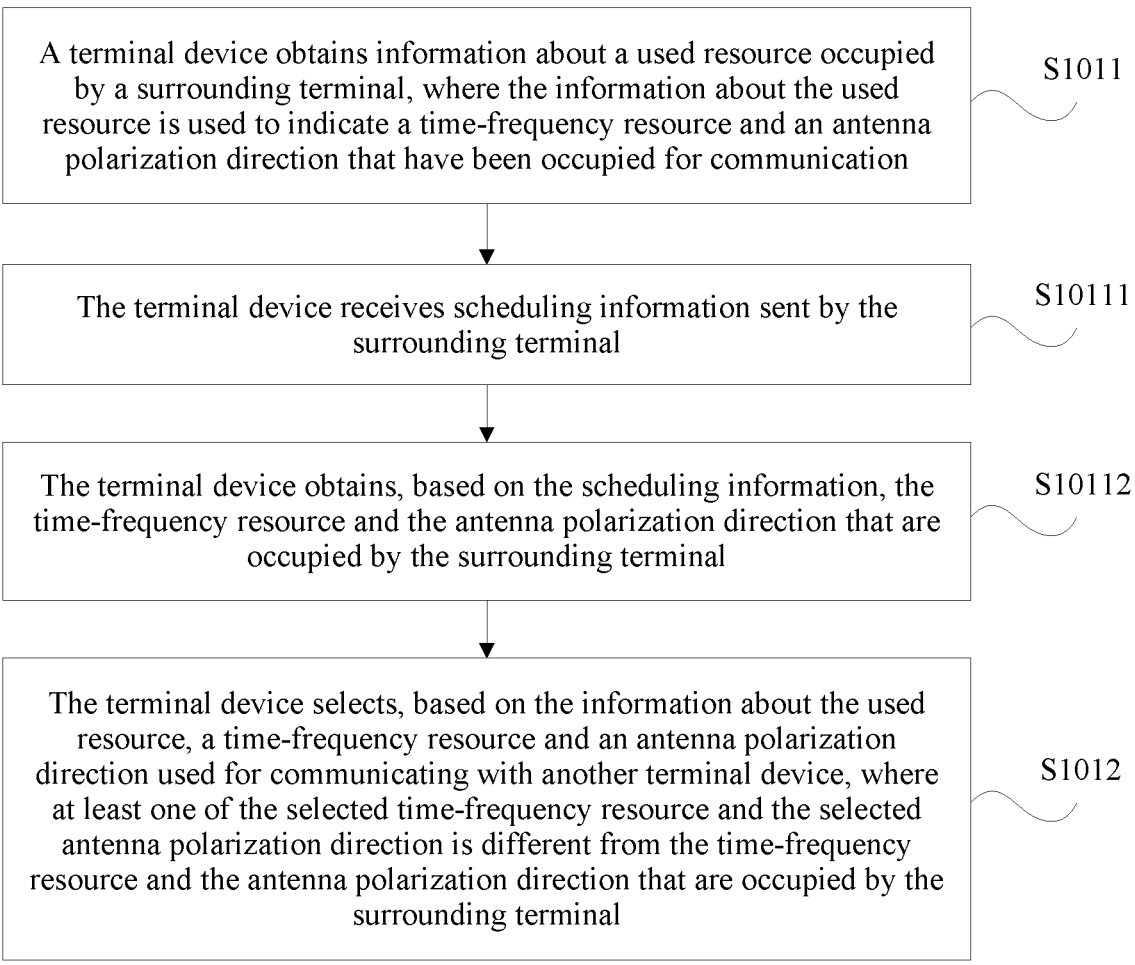
FIG. 9 is a second schematic flowchart of a data exchange method according to an embodiment of this application.

The data exchange method may be applied to the foregoing application scenario 2. That the antenna port is corresponding to an antenna polarization direction is used as an example. It can be learned from FIG. 9 that another manner in which the terminal device can obtain the resource information that can be used to communicate with the another terminal device includes the following steps:

S1011. The terminal device obtains information about a used resource occupied by a surrounding terminal, where the information about the used resource is used to indicate a time-frequency resource and an antenna polarization direction that have been occupied for communication.

In some embodiments, an implementable manner of obtaining, by the terminal device, the information about the used resource is as follows:

S10111. The terminal device receives scheduling information sent by the surrounding terminal.

The surrounding terminal may automatically send scheduling information to the terminal device in real time or according to a preset period, where the scheduling information includes information about a resource used to carry data information, and the resource information may include a time-frequency resource and an antenna port. In specific application, the antenna port may be corresponding to at least one of an antenna polarization direction, an antenna reference symbol sequence, or an antenna reference pattern. The antenna reference symbol sequence or the antenna reference pattern may be specified by the antenna port, or the antenna reference symbol sequence or the antenna reference pattern may be obtained based on an antenna port field in the scheduling information.

S10112. The terminal device obtains, based on the scheduling information, the time-frequency resource and the antenna polarization direction that are occupied by the surrounding terminal.

The terminal device may obtain, according to different pieces of scheduling information sent by the surrounding terminal, the information about the used resource occupied by the surrounding terminal. Therefore, after receiving the scheduling information, the terminal device may perform analysis and processing on the scheduling information. A manner of processing the scheduling information includes: The terminal device demodulates the scheduling information to obtain the time-frequency resource and the antenna polarization direction that are corresponding to a communication resource occupied by the surrounding terminal to send the data information.

Because the scheduling information includes the information about the resource used to carry the data information, after the scheduling information is demodulated, the foregoing resource information can be obtained. Because a specific multiplexing manner of the time-frequency resource corresponding to the scheduling information is not clear, the scheduling information is demodulated in a blind demodulation manner. The blind demodulation manner may include a spatial multiplexing detection manner and a non-spatial multiplexing detection manner. Further, that the terminal device demodulates the scheduling information may include: The terminal device demodulates the scheduling information in a preset spatial multiplexing detection manner, to obtain the antenna port and the time-frequency resource used to carry the data information that are in the scheduling information; or the terminal device demodulates the scheduling information in a preset non-spatial multiplexing detection manner, to obtain the antenna port and the time-frequency resource used to carry the data information that are in the scheduling information. It should be noted that, regardless of a manner of demodulating the scheduling information, the obtained antenna port and time-frequency resource used to carry the data information each may include: resource information used by a plurality of surrounding terminals in a multiplexing or partial multiplexing manner, or resource information used by a single surrounding terminal device.

S1012. The terminal device selects, based on the information about the used resource, the time-frequency resource and the antenna port for communicating with the another terminal device, where at least one of the selected time-frequency resource and the selected antenna port is different from the time-frequency resource and the antenna polarization direction that are occupied by the surrounding terminal.

After determining the information about the used resource, the terminal device may select, based on the information about the used resource, the time-frequency resource and the antenna port that are used to communicate with the another terminal device. When terminal devices need to communicate with other terminal devices, to reduce correlation between the terminal devices and reduce mutual interference, in some specific cases, for example, when a distance between the terminal devices is relatively close, the selected time-frequency resource and antenna port are the same as or different from the time-frequency resource and the antenna port that are occupied by the surrounding terminal. The difference herein includes: The time-frequency resources are different and/or the antenna ports are different. Each antenna port is corresponding to at least one of the following: an antenna polarization direction, an antenna reference symbol sequence, or an antenna reference pattern. For example, it may be further implemented that at least one of the selected time-frequency resource, antenna polarization direction, and antenna reference symbol sequence is different from the time-frequency resource, the antenna polarization direction, and the antenna reference symbol sequence that are occupied by the surrounding terminal. It should be noted that when a distance between the terminal devices is long enough, the selected time-frequency resource and antenna port may be the same as the time-frequency resource and the antenna port that are occupied by the surrounding terminal. In this case, no communication interference is generated between the terminal devices.

According to the data exchange method provided in this application, a multi-antenna port (an antenna polarization direction, an antenna reference symbol sequence, or an antenna reference pattern) selection mechanism is introduced into a V2V communication link, and terminal devices freely contend for time-frequency resources and autonomously select transmit antenna ports, so that the terminal devices using different transmit antenna ports can use a same time-frequency resource, or the terminal devices using different time-frequency resources can use a same antenna port. In other words, an antenna port polarization selection is introduced, and a space dimension is introduced, so that dimensions that can be selected when a terminal device contends for resource information are increased (the space dimension is added to original time and frequency dimensions), thereby effectively increasing an overall system capacity.

Figure 10:
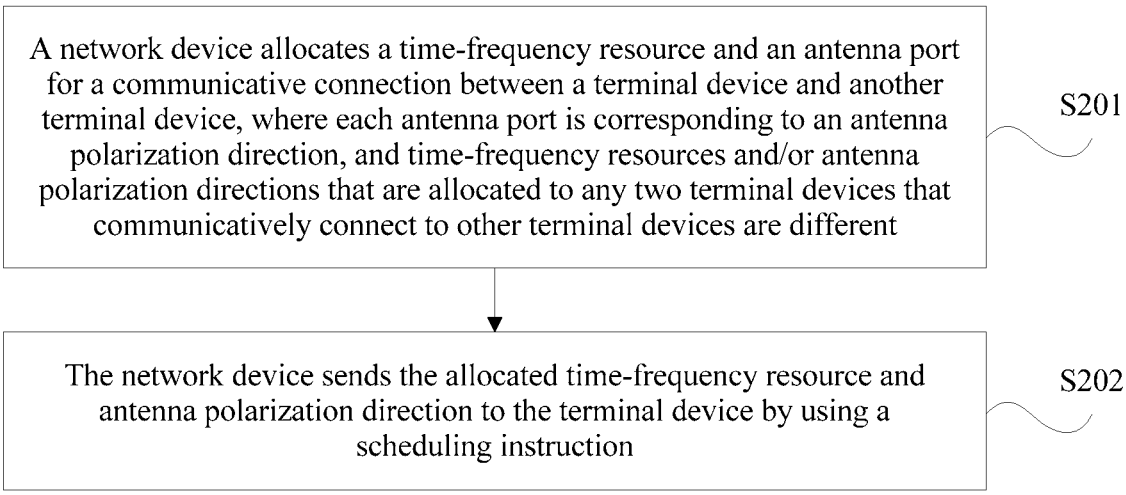
FIG. 10 is a third schematic flowchart of a data exchange method according to an embodiment of this application.

FIG. 10 is a third schematic flowchart of a data exchange method according to an embodiment of this application. It can be learned from FIG. 10 that this embodiment provides another data exchange method. The method may be executed by a network device, that is, the network device configured to interact with a terminal device in the foregoing application scenario 1. The method includes the following steps.

S201. The network device allocates a time-frequency resource and an antenna port for a communicative connection between a terminal device and another terminal device, where each antenna port is corresponding to an antenna polarization direction, and time-frequency resources and/or antenna polarization directions that are allocated to any two terminal devices to communicatively connect to other terminal devices are different.

The time-frequency resource includes time domain resource information and frequency domain resource information. In specific application, each antenna port may be corresponding to at least one of the following: an antenna polarization direction, an antenna reference symbol sequence, or an antenna reference pattern. When each antenna port is corresponding to at least an antenna polarization direction, and when the network device allocates time-frequency resources and antenna polarization directions to different terminal devices, to alleviate a communication conflict between the terminal devices, time-frequency resources and antenna polarization directions that are allocated to any two terminal devices that communicatively connect to other terminal devices may be the same or different. When a distance between a plurality of terminal devices is relatively close, time-frequency resources and/or antenna polarization directions that are allocated to any two terminal devices that communicatively connect to other terminal devices may be set to be different. The difference herein includes: The time-frequency resources are different and/or the antenna polarization directions are different. It should be noted that when a distance between a plurality of terminal devices is relatively long, mutual interference between the terminal devices is small in this case. Therefore, time-frequency resources and antenna polarization directions that are allocated to any two terminal devices that communicatively connect to other terminal devices may be set to be the same.

Figure 5:
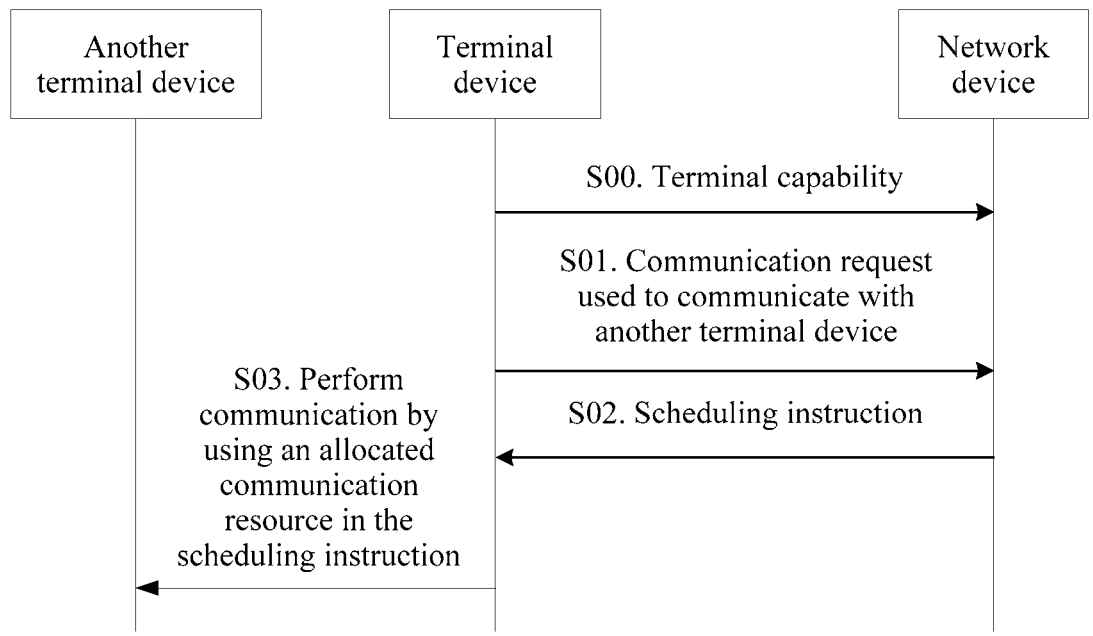
FIG. 5 is a first signaling diagram of a data exchange method according to an embodiment of this application.

Further, for a specific manner of allocating the time-frequency resource and the antenna polarization direction to the terminal device, it can be learned from FIG. 5 that, in an implementable manner, that the network device allocates the time-frequency resource and the antenna polarization direction for the communicative connection between the terminal device and the another terminal device includes:

the network device receives a communication request that is sent by the terminal device and that is used to communicatively connect to the another terminal device; and the network device receives a terminal capability sent by the terminal device, where the terminal capability includes at least an antenna polarization capability of the terminal; and the network device allocates the time-frequency resource and the antenna polarization direction for the communicative connection between the terminal device and the another terminal device based on the antenna polarization capability of the terminal.

In this embodiment, an antenna polarization capability of a terminal device is related to a hardware structure of the terminal device. Therefore, after the hardware structure of the terminal device is determined, the antenna polarization capability is also determined accordingly. The foregoing antenna polarization capability may include a quantity of transmit antennas, a quantity of receive antennas, and an antenna polarization direction, so that the network device allocates corresponding resource information to the terminal device based on the antenna polarization capability of the terminal device.

In a network device scheduling mode, the network device allocates time-frequency resources and antenna polarization directions to different terminal devices. Specifically, the network device may assign different antenna ports to the network devices, that is, allocate different antenna polarization directions to different terminal devices (for example, allocate orthogonal antenna polarization directions to different terminal devices). The network device may further allocate orthogonal antenna reference symbol sequences or antenna reference patterns to different terminal devices.

The network device may allocate time-frequency resources and antenna ports, so that a plurality of different terminal devices send DATA data by using different antenna ports (including antenna polarization directions, and antenna reference symbol sequences or antenna reference patterns) and multiplexing completely the same time-frequency resources (as shown in FIG. 6) or partially the same time-frequency resources (as shown in FIG. 7). Although scheduling information (Scheduling Assignment, SA for short) shown in the figure is sent not in a multi-user MIMO manner, SAs of a plurality of different terminal devices may be actually sent by spatially multiplexing a same time-frequency resource in a same manner. After determining the time-frequency resource and the antenna port that are allocated to the terminal device, the network device sends the foregoing allocated time-frequency resource and antenna port to the terminal device by using a scheduling instruction.

S202. The network device sends the allocated time-frequency resource and antenna polarization direction to the terminal device by using a scheduling instruction.

After determining the time-frequency resource and the antenna polarization direction that are allocated to the terminal device, the network device may send the allocated time-frequency resource and antenna polarization direction to the terminal device by using the scheduling instruction, so that the terminal device can perform analysis and processing on the scheduling instruction, to obtain the allocated time-frequency resource and antenna polarization direction and use the determined time-frequency resource and antenna polarization direction to communicate with the another terminal device, thereby ensuring quality and efficiency of the communication.

According to the data exchange method provided in this application, a multi-antenna port (corresponding to an antenna polarization direction, an antenna reference symbol sequence, or an antenna reference pattern) selection mechanism is introduced in a communication process, and the network device specifies a time-frequency resource and an antenna port that are corresponding to a terminal device, so that terminal devices using different transmit antenna ports can use a same time-frequency resource. In other words, an antenna port polarization selection is introduced, and a space dimension is introduced, so that dimensions that can be selected when a terminal freely contends for a resource are increased (the space dimension is added to original time and frequency dimensions), thereby effectively increasing an overall system capacity.

It can be learned from the foregoing description that the antenna port may be corresponding to at least one of the following: an antenna polarization direction, an antenna reference symbol sequence, or an antenna reference pattern. The following gives description by using a case in which the antenna port is corresponding to an antenna polarization direction. In this case, the network device may be configured to allocate resources for communication performed by a first terminal device and communication performed by a second terminal device. A first manner in which the network device allocates the time-frequency resource and the antenna port for the communicative connection between the terminal device and the another terminal device based on the antenna polarization capability of the terminal includes:

the network device allocates a first time-frequency resource and a first antenna polarization direction for a communicative connection between the first terminal device and another terminal device; and the network device allocates a second time-frequency resource and a second antenna polarization direction for a communicative connection between the second terminal device and another terminal device; where the first time-frequency resource is the same as or partially the same as the second time-frequency resource, and the first antenna polarization direction is different from the second antenna polarization direction.

A manner in which the first antenna polarization direction is different from the second antenna polarization direction is as follows: The first antenna polarization direction is orthogonal to the second antenna polarization direction. Different antenna polarization directions are allocated to the first terminal device and the second terminal device, and the first terminal device and the second terminal device use a same time-frequency resource or partially the same time-frequency resources to communicatively connect to other terminal devices. This helps improve spectrum efficiency and alleviate communication interference between the first terminal device and the second terminal device, thereby ensuring stability and reliability of communication information transmission.

In addition, a second manner in which the network device allocates the time-frequency resource and the antenna port for the communicative connection between the terminal device and the another terminal device based on the antenna polarization capability of the terminal includes:

the network device allocates a first time-frequency resource and a first antenna polarization direction for a communicative connection between the first terminal device and another terminal device; and the network device allocates a second time-frequency resource and a second antenna polarization direction for a communicative connection between the second terminal device and another terminal device; where the first time-frequency resource is different from the second time-frequency resource, and the first antenna polarization direction is the same as or different from the second antenna polarization direction.

The same or different antenna polarization directions and different time-frequency resources are allocated to the first terminal device and the second terminal device to communicatively connect to other terminal devices. Because the time-frequency resources are orthogonal, user signals do not interfere with each other.

It should be noted that a third manner in which the network device allocates the time-frequency resource and the antenna port for the communicative connection between the terminal device and the another terminal device based on the antenna polarization capability of the terminal includes:

the network device allocates a first time-frequency resource and a first antenna polarization direction for a communicative connection between the first terminal device and another terminal device; and the network device allocates a second time-frequency resource and a second antenna polarization direction for a communicative connection between the second terminal device and another terminal device; where when a distance between the first terminal device and the second terminal device is greater than or equal to a preset distance threshold, the first time-frequency resource is the same as or different from the second time-frequency resource, and the first antenna polarization direction is the same as or different from the second antenna polarization direction.

When the distance between the first terminal device and the second terminal device is long enough, a signal of the first terminal device and a signal of the second terminal device do not interfere with each other. Therefore, the same or different antenna polarization directions and the same or different time-frequency resources may be allocated to the first terminal device and the second terminal device to communicatively connect to other terminal devices.

The following gives description by using a case in which the antenna port corresponds to an antenna polarization direction, and an antenna reference symbol sequence or an antenna reference pattern, that is, the antenna port is corresponding to the antenna polarization direction and the antenna reference symbol sequence, or the antenna port is corresponding to the antenna polarization direction and the antenna reference pattern. In this case, the resource information allocated to the terminal device is used to indicate the time-frequency resource, the antenna polarization direction, and the antenna reference symbol sequence or the antenna reference pattern used for communication. In this case, the network device needs to allocate resource information for communication between a first terminal device and a second terminal device. A manner in which the network device allocates the time-frequency resource and the antenna port for the communicative connection between the terminal device and the another terminal device based on the antenna polarization capability of the terminal includes:

the network device allocates a first time-frequency resource, a first antenna polarization direction, and a first antenna reference symbol sequence or a first antenna reference pattern for a communicative connection between the first terminal device and another terminal device; and the network device allocates a second time-frequency resource, a second antenna polarization direction, and a second antenna reference symbol sequence or a second antenna reference pattern for a communicative connection between the second terminal device and another terminal device; where the first time-frequency resource is the same as or partially the same as the second time-frequency resource, the first antenna polarization direction is different from the second antenna polarization direction, and the first antenna reference symbol sequence is different from the second antenna reference symbol sequence, or the first antenna reference pattern is different from the second antenna reference pattern.

It should be noted that a manner of implementing "the first antenna polarization direction is different from the second antenna polarization direction, and the first antenna reference symbol sequence is different from the second antenna reference symbol sequence, or the first antenna reference pattern is different from the second antenna reference pattern" is as follows: The first antenna polarization direction is orthogonal to the second antenna polarization direction, and the first antenna reference symbol sequence is orthogonal to the second antenna reference symbol sequence, or the first antenna reference pattern is orthogonal to the second antenna reference pattern.

Different antenna polarization directions are allocated to the first terminal device and the second terminal device, and the first terminal device and the second terminal device use different antenna reference symbol sequences or different antenna reference patterns and use a same time-frequency resource or partially the same time-frequency resources, to communicatively connect to other terminal devices, so that spectrum efficiency can be improved, and mutual interference between the first terminal device and the second terminal device can be effectively alleviated, thereby ensuring stability and reliability of communication information transmission.

In addition, a second manner in which the network device allocates the time-frequency resource and the antenna port for the communicative connection between the terminal device and the another terminal device based on the antenna polarization capability of the terminal includes:

the network device allocates a first time-frequency resource, a first antenna polarization direction, and a first antenna reference symbol sequence or a first antenna reference pattern for a communicative connection between the first terminal device and another terminal device; and the network device allocates a second time-frequency resource, a second antenna polarization direction, and a second antenna reference symbol sequence or a second antenna reference pattern for a communicative connection between the second terminal device and another terminal device; where the first time-frequency resource is different from the second time-frequency resource, the first antenna polarization direction is the same as or different from the second antenna polarization direction, and the first antenna reference symbol sequence is the same as or different from the second antenna reference symbol sequence, or the first antenna reference pattern is the same as or different from the second antenna reference pattern.

The same or different antenna polarization directions, different time-frequency resources, and the same or different antenna reference symbol sequences or antenna reference patterns are allocated to the first terminal device and the second terminal device to communicatively connect to other terminal devices. Because the time-frequency resources are orthogonal, user signals do not interfere with each other.

In addition, a third manner in which the network device allocates the time-frequency resource and the antenna port for the communicative connection between the terminal device and the another terminal device based on the antenna polarization capability of the terminal includes:

the network device allocates a first time-frequency resource, a first antenna polarization direction, and a first antenna reference symbol sequence or a first antenna reference pattern for a communicative connection between the first terminal device and another terminal device; and the network device allocates a second time-frequency resource, a second antenna polarization direction, and a second antenna reference symbol sequence or a second antenna reference pattern for a communicative connection between the second terminal device and another terminal device; where when a distance between the first terminal device and the second terminal device is greater than or equal to a preset distance threshold, the first time-frequency resource is the same as or different from the second time-frequency resource, the first antenna polarization direction is the same as or different from the second antenna polarization direction, and the first antenna reference symbol sequence is the same as or different from the second antenna reference symbol sequence, or the first antenna reference pattern is the same as or different from the second antenna reference pattern.

When the distance between the first terminal device and the second terminal device is long enough, communication performed by the first terminal device and communication performed by the second terminal device do not conflict with each other. Therefore, the same or different antenna polarization directions, the same or different time-frequency resources, and the same or different antenna reference symbol sequences or antenna reference patterns may be allocated to the first terminal device and the second terminal device to communicatively connect to other terminal devices.

Figure 11:
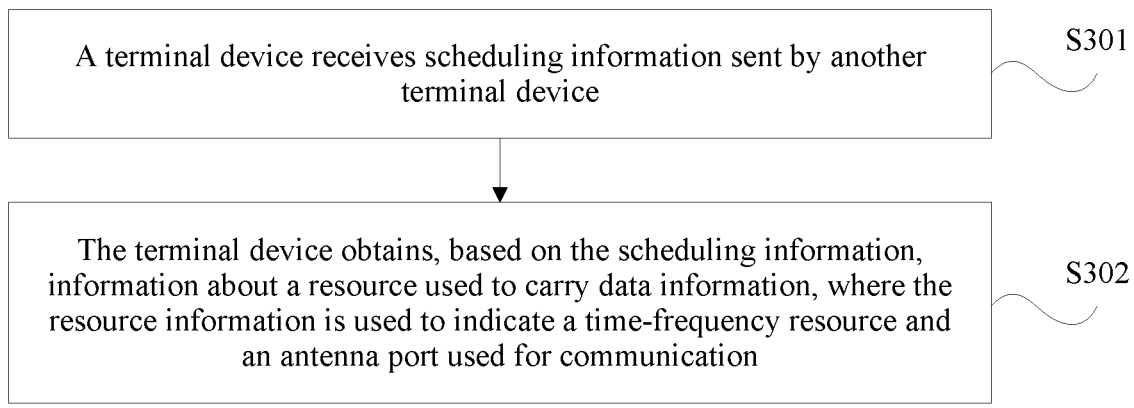
FIG. 11 is a fourth schematic flowchart of a data exchange method according to an embodiment of this application.

FIG. 11 is a third schematic flowchart of a data exchange method according to an embodiment of this application. It can be learned from FIG. 11 that this application provides another data exchange method. The method is executed by a terminal device. Specifically, the terminal device may be any one of other terminal devices configured to communicate with the terminal device in the foregoing application scenario 1 or application scenario 2. Specifically, the terminal device receives scheduling information and data information that are sent by another terminal device. Specifically, the method includes the following steps.

S301. The terminal device receives scheduling information sent by another terminal device.

The scheduling information includes information about a resource used to carry data information, and the resource information is used to indicate a time-frequency resource and an antenna port used for communication. The time-frequency resource includes time domain resource information and frequency domain resource information. The antenna port may be corresponding to at least one of the following: an antenna polarization direction, an antenna reference symbol sequence, or an antenna reference pattern. In addition, a specific implementation process of receiving the scheduling information by the terminal device is not limited. In an implementable manner, the another terminal device actively sends scheduling information in real time or according to a preset period, so that the terminal device can receive the scheduling information. In another implementable manner, the terminal device sends a scheduling obtaining request to another terminal device, and the another terminal device sends the scheduling information to the terminal device according to the sent scheduling obtaining request, so that the terminal device can receive the scheduling information.

S302. The terminal device obtains, based on the scheduling information, information about a resource used to carry data information, where the resource information is used to indicate a time-frequency resource and an antenna port used for communication.

Each antenna port is corresponding to an antenna polarization direction, and time-frequency resources and/or antenna polarization directions that are used by the terminal device to receive scheduling information sent by any two other terminal devices are different.

After obtaining the scheduling information, the terminal device may obtain, based on a result obtained through analysis and processing of the scheduling information, the information about the resource used to carry the data information.

Specifically, a manner in which the terminal device can obtain, based on the scheduling information, the information about the resource used to carry the data information includes:

the terminal device demodulates the scheduling information to obtain the time-frequency resource and the antenna port that are used by the another terminal device to carry the data information.

Specifically, after the scheduling information is demodulated, the antenna port and the time-frequency resource used to carry the data information can be obtained. Further, detection is performed on the time-frequency resource to obtain the sent data information. In other words, the terminal device can obtain, based on the time-frequency resource, the data information sent by the another terminal device. Because a specific multiplexing manner of the time-frequency resource corresponding to the scheduling information is not clear, the scheduling information is demodulated in a blind demodulation manner. The blind demodulation manner may include a spatial multiplexing detection manner and a non-spatial multiplexing detection manner. Further, a manner in which the terminal device demodulates the scheduling information may include: The terminal device demodulates the scheduling information in a preset spatial multiplexing detection manner, to obtain the antenna port and the time-frequency resource used to carry the data information that are in the scheduling information; or the terminal device demodulates the scheduling information in a preset non-spatial multiplexing detection manner, to obtain the antenna port and the time-frequency resource used to carry the data information that are in the scheduling information. It should be noted that, regardless of a manner of demodulating the scheduling information, the obtained antenna port and time-frequency resource used to carry the data information each may include: resource information used by a plurality of surrounding terminals in a multiplexing or partial multiplexing manner, or resource information that is not used by surrounding terminal devices in a multiplexing manner.

According to the data exchange method provided in this application, the terminal device receives the scheduling information, demodulates the scheduling information to obtain the time-frequency resource and the antenna port, and may further obtain the data information sent by the another terminal device. Because an antenna polarization selection mechanism is introduced, channel correlation between terminal devices is reduced, mutual interference between terminal devices that perform spatial multiplexing can be further reduced, and a communication capacity of an entire system is improved, thereby ensuring stability and reliability of information exchange.

Because the antenna port may be corresponding to at least one of an antenna polarization direction, an antenna reference symbol sequence, or an antenna reference pattern. The following gives description by using a case in which the antenna port is corresponding to an antenna polarization direction. In this case, for the terminal device, when other terminal devices configured to communicate with the terminal device include at least a first terminal device and a second terminal device, a first manner in which the terminal device receives the scheduling information sent by the another terminal device includes:

the terminal device receives first scheduling information sent by the first terminal device by using a first time-frequency resource and a first antenna polarization direction; and the terminal device receives second scheduling information sent by the second terminal device by using a second time-frequency resource and a second antenna polarization direction; where the first time-frequency resource is the same as or partially the same as the second time-frequency resource, and the first antenna polarization direction is different from the second antenna polarization direction.

A manner in which the first antenna polarization direction is different from the second antenna polarization direction is as follows: The first antenna polarization direction is orthogonal to the second antenna polarization direction. The first terminal device and the second terminal device communicatively connect to the terminal device by using different antenna polarization directions and using a same time-frequency resource or partially the same time-frequency resources. This helps improve spectrum efficiency and alleviate communication interference between the first terminal device and the second terminal device, thereby ensuring stability and reliability of communication information transmission.

In addition, a second manner in which the terminal device can receive the scheduling information sent by the another terminal device includes:

the terminal device receives first scheduling information sent by the first terminal device by using a first time-frequency resource and a first antenna polarization direction; and the terminal device receives second scheduling information sent by the second terminal device by using a second time-frequency resource and a second antenna polarization direction; where the first time-frequency resource is different from the second time-frequency resource, and the first antenna polarization direction is the same as or different from the second antenna polarization direction.

The first terminal device and the second terminal device communicatively connect to the terminal device by using the same or different antenna polarization directions and different time-frequency resources. Because the time-frequency resources are orthogonal, user signals do not interfere with each other.

It should be noted that a third manner in which the terminal device receives the scheduling information sent by the another terminal device includes:

the terminal device receives first scheduling information sent by the first terminal device by using a first time-frequency resource and a first antenna polarization direction; and the terminal device receives second scheduling information sent by the second terminal device by using a second time-frequency resource and a second antenna polarization direction; where when a distance between the first terminal device and the second terminal device is greater than or equal to a preset distance threshold, the first time-frequency resource is the same as or different from the second time-frequency resource, and the first antenna polarization direction is the same as or different from the second antenna polarization direction.

When the distance between the first terminal device and the second terminal device is long enough, a signal of the first terminal device and a signal of the second terminal device do not interfere with each other. Therefore, the first terminal device and the second terminal device may communicatively connect to the terminal device by using the same or different antenna polarization directions and the same or different time-frequency resources.

Figure 12:
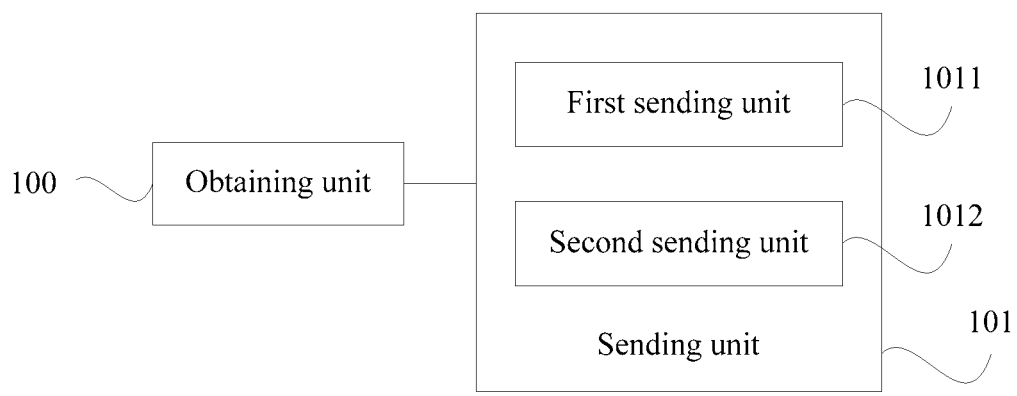
FIG. 12 is a first schematic structural diagram of a terminal device according to an embodiment of this application.

FIG. 12 is a first schematic structural diagram of a terminal device according to an embodiment of this application. It can be learned from FIG. 12 that this application provides a terminal device. The terminal device is configured to execute the foregoing data exchange method corresponding to FIG. 3 to FIG. 8. Specifically, the terminal device includes:

an obtaining unit 100, configured to obtain resource information that can be used to communicate with another terminal device, where the resource information is used to indicate a time-frequency resource and an antenna port used for the communication, and each antenna port is corresponding to an antenna polarization direction; and a sending unit 101, configured to send scheduling information and data information to the another terminal device by using the time-frequency resource and the antenna polarization direction, where the scheduling information includes the antenna polarization direction and the time-frequency resource used to carry the data information, and time-frequency resources and/or antenna polarization directions that are used by any two terminal devices to send scheduling information and data information to other terminal devices are different.

In specific application, the antenna port may be corresponding to at least one of an antenna polarization direction, an antenna reference symbol sequence, and an antenna reference pattern, and the time-frequency resource includes time domain resource information and frequency domain resource information. In addition, the foregoing obtaining unit 100 may perform step S101 of the method shown in FIG. 3, and the sending unit 101 may perform step S102 of the method shown in FIG. 3.

Specifically, the sending unit 101 includes a first sending unit 1011 disposed in a first terminal device and a second sending unit 1012 disposed in a second terminal device. Further, an implementable manner of sending the scheduling information and the data information to the another terminal device by using the time-frequency resource and the antenna polarization direction is as follows:

the first sending unit 1011 is configured to broadcast first scheduling information and first data information to another terminal device by using a first time-frequency resource and a first antenna polarization direction; and the second sending unit 1012 is configured to broadcast second scheduling information and second data information to another terminal device by using a second time-frequency resource and a second antenna polarization direction; where the first time-frequency resource is the same as or partially the same as the second time-frequency resource, and the first antenna polarization direction is different from the second antenna polarization direction.

Specifically, a manner in which the first antenna polarization direction is different from the second antenna polarization direction is as follows: The first antenna polarization direction is orthogonal to the second antenna polarization direction.

Further, in another implementable manner, the first sending unit 1011 is configured to broadcast first scheduling information and first data information to another terminal device by using a first time-frequency resource and a first antenna polarization direction; and the second sending unit 1012 is configured to broadcast second scheduling information and second data information to another terminal device by using a second time-frequency resource and a second antenna polarization direction; where the first time-frequency resource is different from the second time-frequency resource, and the first antenna polarization direction is the same as or different from the second antenna polarization direction.

Further, in still another implementable manner, the first sending unit 1011 is configured to broadcast first scheduling information and first data information to another terminal device by using a first time-frequency resource and a first antenna polarization direction; and the second sending unit 1012 is configured to broadcast second scheduling information and second data information to another terminal device by using a second time-frequency resource and a second antenna polarization direction; where when a distance between the first sending unit 1011 and the second communications unit 1012 is greater than or equal to a preset distance threshold, the first time-frequency resource is the same as or different from the second time-frequency resource, and the first antenna polarization direction is the same as or different from the second antenna polarization direction.

In addition, when the antenna port is corresponding to an antenna polarization direction, and an antenna reference symbol sequence or an antenna reference pattern. In other words, the antenna port is corresponding to the antenna polarization direction and the antenna reference symbol sequence, or the antenna port is corresponding to the antenna polarization direction and the antenna reference pattern. In this case, when communicating with the another terminal device by using the resource information, the sending unit 101 may be configured to:

send the scheduling information and the data information to the another terminal device by using the time-frequency resource, the antenna polarization direction, and the antenna reference symbol sequence or the antenna reference pattern; where the scheduling information includes the antenna polarization direction, the antenna reference symbol sequence or the antenna reference pattern, and the time-frequency resource used to carry the data information, and time-frequency resources, antenna polarization directions, and antenna reference symbol sequences or antenna reference patterns used by any two terminal devices to send scheduling information and data information to other terminal devices are the same or different.

Further, when the sending unit 101 includes a first sending unit 1011 disposed in a first terminal device and a second sending unit 1012 disposed in a second terminal device, an implementable manner of sending the scheduling information and the data information to the another terminal device by using the time-frequency resource and the antenna polarization direction is as follows:

the first sending unit 1011 is configured to broadcast first scheduling information and first data information to another terminal device by using a first time-frequency resource, a first antenna polarization direction, and a first antenna reference symbol sequence or a first antenna reference pattern; and the second sending unit 1012 is configured to broadcast second scheduling information and second data information to another terminal device by using a second time-frequency resource, a second antenna polarization direction, and a second antenna reference symbol sequence or a second antenna reference pattern; and the first time-frequency resource is the same as or partially the same as the second time-frequency resource, the first antenna polarization direction is orthogonal to the second antenna polarization direction, and the first antenna reference symbol sequence is orthogonal to the second antenna reference symbol sequence, or the first antenna reference pattern is orthogonal to the second antenna reference pattern.

Further, in another implementable manner, the first sending unit 1011 is configured to broadcast first scheduling information and first data information to another terminal device by using a first time-frequency resource, a first antenna polarization direction, and a first antenna reference symbol sequence or a first antenna reference pattern; and the second sending unit 1012 is configured to broadcast second scheduling information and second data information to another terminal device by using a second time-frequency resource, a second antenna polarization direction, and a second antenna reference symbol sequence or a second antenna reference pattern; and the first time-frequency resource is different from the second time-frequency resource, the first antenna polarization direction is the same as or different from the second antenna polarization direction, and the first antenna reference symbol sequence is the same as or different from the second antenna reference symbol sequence, or the first antenna reference pattern is the same as or different from the second antenna reference pattern.

Alternatively, still another implementable manner is as follows:

the first sending unit 1011 is configured to broadcast first scheduling information and first data information to another terminal device by using a first time-frequency resource, a first antenna polarization direction, and a first antenna reference symbol sequence or a first antenna reference pattern; and the second sending unit 1012 is configured to broadcast second scheduling information and second data information to another terminal device by using a second time-frequency resource, a second antenna polarization direction, and a second antenna reference symbol sequence or a second antenna reference pattern; and when a distance between the first sending unit 1011 and the second sending unit 1012 is greater than or equal to a preset distance threshold, the first time-frequency resource is the same as or different from the second time-frequency resource, the first antenna polarization direction is the same as or different from the second antenna polarization direction, and the first antenna reference symbol sequence is the same as or different from the second antenna reference symbol sequence, or the first antenna reference pattern is the same as or different from the second antenna reference pattern.

Further, the obtaining unit 100 may be further configured to:

before a scheduling instruction sent by a network device is received, send a terminal capability to the network device, where the terminal capability includes at least an antenna polarization capability of the terminal; and send, to the network device, a communication request used to communicate with the another terminal device, so that the network device allocates the time-frequency resource and the antenna port for the communicative connection between the terminal device and the another terminal device based on the antenna polarization capability of the terminal, where the antenna port herein is corresponding to at least an antenna polarization direction.

The obtaining unit 100 may be further configured to:

receive the scheduling instruction sent by the network device, where the scheduling instruction includes the time-frequency resource and the antenna polarization direction that are allocated for the communicative connection between the terminal device and the another terminal device, and time-frequency resources and/or antenna polarization directions that are allocated to any two terminal devices to communicatively connect to other terminals are different.

Further, the obtaining unit 100 is specifically configured to:

obtain information about a used resource occupied by a surrounding terminal, where the information about the used resource is used to indicate a time-frequency resource and an antenna polarization direction that have been occupied for communication; and select, based on the information about the used resource, the time-frequency resource and the antenna polarization direction for communicating with the another terminal device, where at least one of the selected time-frequency resource and the selected antenna polarization direction is different from the time-frequency resource and the antenna polarization direction that are occupied by the surrounding terminal.

Further, when obtaining the information about the used resource occupied by the surrounding terminal, the obtaining unit 100 may be configured to:

receive scheduling information sent by the surrounding terminal; and obtain, based on the scheduling information, the information about the used resource occupied by the surrounding terminal.

Specifically, when obtaining, based on the scheduling information, the information about the used resource occupied by the surrounding terminal, the obtaining unit 100 is configured to:

demodulate the scheduling information to obtain the information about the used resource corresponding to a communication resource occupied by the surrounding terminal to send data information.

A manner in which the obtaining unit 100 can demodulate the scheduling information is: demodulating the scheduling information in a preset spatial multiplexing detection manner, to obtain the antenna port and the time-frequency resource used to carry the data information that are in the scheduling information.

Another manner in which the obtaining unit 100 can demodulate the scheduling information is: demodulating the scheduling information in a preset non-spatial multiplexing detection manner, to obtain the antenna port and the time-frequency resource used to carry the data information that are in the scheduling information.

The terminal device in the embodiment shown in FIG. 12 may be configured to execute the technical solution of the embodiment shown in FIG. 3 to FIG. 9 in the foregoing method, and implementation principles and technical effects of the terminal device are similar and are not described herein again.

Figure 13:
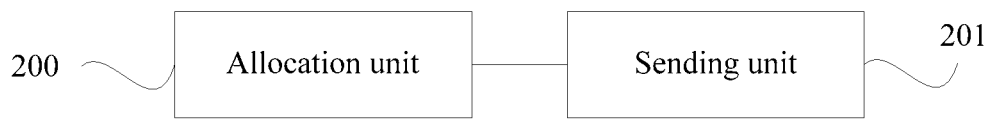
FIG. 13 is a first schematic structural diagram of a network device according to an embodiment of this application.

FIG. 13 is a first schematic structural diagram of a network device according to an embodiment of this application. It can be learned from FIG. 13 that this embodiment provides a network device. The network device is configured to communicatively connect to a terminal device. Specifically, the network device can execute the data exchange method shown in FIG. 10. The network device includes:

an allocation unit 200, configured to allocate a time-frequency resource and an antenna port for a communicative connection between a terminal device and another terminal device, where each antenna port is corresponding to an antenna polarization direction, and time-frequency resources and/or antenna polarization directions that are allocated to any two terminal devices to communicatively connect to other terminal devices are different; and a sending unit 201, configured to send the allocated time-frequency resource and antenna polarization direction to the terminal device by using a scheduling instruction.

The antenna port may be corresponding to at least one of an antenna polarization direction, an antenna reference symbol sequence, and an antenna reference pattern, and the time-frequency resource includes time domain resource information and frequency domain resource information. In addition, the allocation unit 200 may perform step S201 of the method shown in FIG. 10, and the sending unit 201 may perform step S202 of the method shown in FIG. 10.

Further, when allocating the time-frequency resource and the antenna port for the communicative connection between the terminal device and the another terminal device, the allocation unit 200 may be configured to:

receive a communication request for communicatively connecting to the another terminal device that is sent by the terminal device;

receive a terminal capability sent by the terminal device, where the terminal capability includes at least an antenna polarization capability of the terminal; and allocate the time-frequency resource and the antenna port for the communicative connection between the terminal device and the another terminal device based on the antenna polarization capability of the terminal, where in this case, the antenna port is corresponding to at least one antenna polarization direction.

Further, when the antenna port is corresponding to only the antenna polarization direction, an implementable manner in which the allocation unit 200 allocates the time-frequency resource and the antenna polarization direction for the communicative connection between the terminal device and the another terminal device based on the antenna polarization capability of the terminal includes:

allocating a first time-frequency resource and a first antenna polarization direction for a communicative connection between a first terminal device and another terminal device; and allocating a second time-frequency resource and a second antenna polarization direction for a communicative connection between the first terminal device and another terminal device; where the first time-frequency resource is the same as or partially the same as the second time-frequency resource, and the first antenna polarization direction is different from the second antenna polarization direction.

A manner in which the first antenna polarization direction is different from the second antenna polarization direction is as follows: The first antenna polarization direction is orthogonal to the second antenna polarization direction.

Further, another implementable manner in which the allocation unit 200 allocates the time-frequency resource and the antenna port for the communicative connection between the terminal device and the another terminal device based on the antenna polarization capability of the terminal includes:

allocating a first time-frequency resource and a first antenna polarization direction for a communicative connection between a first terminal device and another terminal device; and allocating a second time-frequency resource and a second antenna polarization direction for a communicative connection between a second terminal device and another terminal device; where the first time-frequency resource is different from the second time-frequency resource, and the first antenna polarization direction is the same as or different from the second antenna polarization direction.

Further, still another implementable manner in which the allocation unit 200 allocates the time-frequency resource and the antenna port for the communicative connection between the terminal device and the another terminal device based on the antenna polarization capability of the terminal includes:

allocating a first time-frequency resource and a first antenna polarization direction for a communicative connection between a first terminal device and another terminal device; and allocating a second time-frequency resource and a second antenna polarization direction for a communicative connection between a second terminal device and another terminal device; where when a distance between the first terminal device and the second terminal device is greater than or equal to a preset distance threshold, the first time-frequency resource is the same as or different from the second time-frequency resource, and the first antenna polarization direction is the same as or different from the second antenna polarization direction.

In addition, when the antenna port is corresponding to an antenna polarization direction, and an antenna reference symbol sequence or an antenna reference pattern, that is, the antenna port is corresponding to the antenna polarization direction and the antenna reference symbol sequence, or the antenna port is corresponding to the antenna polarization direction and the antenna reference pattern, an implementable manner in which the allocation unit 200 allocates the time-frequency resource and the antenna port for the communicative connection between the terminal device and the another terminal device based on the antenna polarization capability of the terminal includes:

allocating a first time-frequency resource, a first antenna polarization direction, and a first antenna reference symbol sequence or a first antenna reference pattern for a communicative connection between a first terminal device and another terminal device; and allocating a second time-frequency resource, a second antenna polarization direction, and a second antenna reference symbol sequence or a second antenna reference pattern for a communicative connection between a second terminal device and another terminal device; where the first time-frequency resource is the same as or partially the same as the second time-frequency resource, the first antenna polarization direction is different from the second antenna polarization direction, and the first antenna reference symbol sequence is different from the second antenna reference symbol sequence, or the first antenna reference pattern is different from the second antenna reference pattern.

A manner of implementing "the first antenna polarization direction is different from the second antenna polarization direction, and the first antenna reference symbol sequence is different from the second antenna reference symbol sequence, or the first antenna reference pattern is different from the second antenna reference pattern" is as follows: The first antenna polarization direction is orthogonal to the second antenna polarization direction, and the first antenna reference symbol sequence is orthogonal to the second antenna reference symbol sequence, or the first antenna reference pattern is orthogonal to the second antenna reference pattern.

Further, another implementable manner in which the allocation unit 200 allocates the time-frequency resource and the antenna port for the communicative connection between the terminal device and the another terminal device based on the antenna polarization capability of the terminal includes:

allocating a first time-frequency resource, a first antenna polarization direction, and a first antenna reference symbol sequence or a first antenna reference pattern for a communicative connection between a first terminal device and another terminal device; and allocating a second time-frequency resource, a second antenna polarization direction, and a second antenna reference symbol sequence or a second antenna reference pattern for a communicative connection between a second terminal device and another terminal device; where the first time-frequency resource is different from the second time-frequency resource, the first antenna polarization direction is the same as or different from the second antenna polarization direction, and the first antenna reference symbol sequence is the same as or different from the second antenna reference symbol sequence, or the first antenna reference pattern is the same as or different from the second antenna reference pattern.

Further, still another implementable manner in which the allocation unit 200 allocates the time-frequency resource and the antenna port for the communicative connection between the terminal device and the another terminal device based on the antenna polarization capability of the terminal includes:

allocating a first time-frequency resource, a first antenna polarization direction, and a first antenna reference symbol sequence or a first antenna reference pattern for a communicative connection between a first terminal device and another terminal device; and allocating a second time-frequency resource, a second antenna polarization direction, and a second antenna reference symbol sequence or a second antenna reference pattern for a communicative connection between a second terminal device and another terminal device; where when a distance between the first terminal device and the second terminal device is greater than or equal to a preset distance threshold, the first time-frequency resource is the same as or different from the second time-frequency resource, the first antenna polarization direction is the same as or different from the second antenna polarization direction, and the first antenna reference symbol sequence is the same as or different from the second antenna reference symbol sequence, or the first antenna reference pattern is the same as or different from the second antenna reference pattern.

The network device in the embodiment shown in FIG. 13 may be configured to execute the technical solution of the embodiment shown in FIG. 10 in the foregoing method, and implementation principles and technical effects of the network device are similar and are not described herein again.

Figure 14:
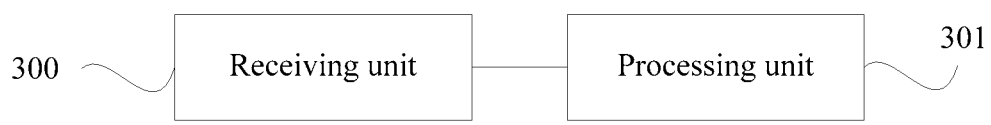
FIG. 14 is a second schematic structural diagram of a terminal device according to an embodiment of this application.

FIG. 14 is a second schematic structural diagram of a terminal device according to an embodiment of this application. It can be learned from FIG. 14 that this application provides another terminal device. The terminal device is configured to communicate with another terminal device, and may perform the steps of the foregoing data exchange method corresponding to FIG. 11. Specifically, the terminal device includes:

a receiving unit 300, configured to receive scheduling information sent by another terminal device; and a processing unit 301, configured to obtain, based on the scheduling information, information about a resource used to carry data information, where the resource information is used to indicate a time-frequency resource and an antenna port used for communication; where each antenna port is corresponding to an antenna polarization direction, and time-frequency resources and/or antenna polarization directions that are used by the terminal device to receive scheduling information sent by any two other terminal devices are different.

It should be noted that, in specific application, the antenna port may be corresponding to at least one of an antenna polarization direction, an antenna reference symbol sequence, and an antenna reference pattern, and the time-frequency resource includes time domain resource information and frequency domain resource information. In addition, the receiving unit 300 may perform step S301 of the method shown in FIG. 11, and the processing unit 301 may perform step S302 of the method shown in FIG. 11.

When the antenna port is corresponding to an antenna polarization direction, when obtaining, based on the scheduling information, the information about the resource used to carry the data information, the processing unit 301 may be configured to:

demodulate the scheduling information to obtain the data information sent by the another terminal device, the antenna polarization direction, and the time-frequency resource used to carry the data information.

Specifically, when demodulating the scheduling information, the processing unit 301 may be configured to:

demodulate the scheduling information in a preset spatial multiplexing detection manner, to obtain the antenna polarization direction and the time-frequency resource used to carry the data information that are in the scheduling information; and/or demodulate the scheduling information in a preset non-spatial multiplexing detection manner, to obtain the antenna polarization direction and the time-frequency resource used to carry the data information that are in the scheduling information.

Similarly, when the antenna port is corresponding to the antenna polarization direction, and the antenna reference symbol sequence or the antenna reference pattern, when the scheduling information is demodulated, the data information sent by the another terminal device, the time-frequency resource used to carry the data information, the antenna polarization direction, and the antenna reference symbol sequence or the antenna reference pattern may be obtained.

The terminal device in the embodiment shown in FIG. 14 may be configured to execute the technical solution of the embodiment shown in FIG. 11 in the foregoing method, and implementation principles and technical effects of the terminal device are similar and are not described herein again.

It can be learned from the foregoing description that because the antenna port may be corresponding to at least one of an antenna polarization direction, an antenna reference symbol sequence, or an antenna reference pattern. The following gives description by using a case in which the antenna port is corresponding to an antenna polarization direction. In this case, for the terminal device, when other terminal devices configured to communicate with the terminal device include at least a first terminal device and a second terminal device, a first manner in which the receiving unit 300 receives the scheduling information sent by the another terminal device includes:

receiving first scheduling information sent by a first terminal device by using a first time-frequency resource and a first antenna polarization direction; and receiving second scheduling information sent by a second terminal device by using a second time-frequency resource and a second antenna polarization direction; where the first time-frequency resource is the same as or partially the same as the second time-frequency resource, and the first antenna polarization direction is different from the second antenna polarization direction.

A manner in which the first antenna polarization direction is different from the second antenna polarization direction is as follows: The first antenna polarization direction is orthogonal to the second antenna polarization direction. The first terminal device and the second terminal device communicatively connect to the terminal device by using different antenna polarization directions and using a same time-frequency resource or partially the same time-frequency resources. This helps improve spectrum efficiency and alleviate communication interference between the first terminal device and the second terminal device, thereby ensuring stability and reliability of communication information transmission.

In addition, a second manner in which the receiving unit 300 can receive the scheduling information sent by the another terminal device includes:

receiving first scheduling information sent by a first terminal device by using a first time-frequency resource and a first antenna polarization direction; and receiving second scheduling information sent by a second terminal device by using a second time-frequency resource and a second antenna polarization direction; where the first time-frequency resource is different from the second time-frequency resource, and the first antenna polarization direction is the same as or different from the second antenna polarization direction.

The first terminal device and the second terminal device communicatively connect to the terminal device by using the same or different antenna polarization directions and different time-frequency resources. Because the time-frequency resources are orthogonal, user signals do not interfere with each other.

It should be noted that a third manner in which the receiving unit 300 receives the scheduling information sent by the another terminal device includes:

receiving first scheduling information sent by a first terminal device by using a first time-frequency resource and a first antenna polarization direction; and receiving second scheduling information sent by a second terminal device by using a second time-frequency resource and a second antenna polarization direction; where when a distance between the first terminal device and the second terminal device is greater than or equal to a preset distance threshold, the first time-frequency resource is the same as or different from the second time-frequency resource, and the first antenna polarization direction is the same as or different from the second antenna polarization direction.

When the distance between the first terminal device and the second terminal device is long enough, a signal of the first terminal device and a signal of the second terminal device do not interfere with each other. Therefore, the first terminal device and the second terminal device may communicatively connect to the terminal device by using the same or different antenna polarization directions and the same or different time-frequency resources.

It should be understood that division of the units in the foregoing terminal device and the foregoing network device is merely logical function division. In actual implementation, all or some of the units may be integrated into one physical entity, or the units may be physically separated. In addition, these units may all be implemented in a form of software invoked by using a processing element, or may all be implemented in a form of hardware; or some units may be implemented in a form of software invoked by using a processing element, and some units may be implemented in a form of hardware. For example, the sending unit may be an independently disposed processing element, or may be integrated into a chip of a terminal device or a network device, for implementation. In addition, the sending unit may be stored, in the form of program, in a memory in a terminal device or a network device, and be invoked by a processing element in the terminal device or the network device, to perform the functions of the foregoing units. Implementation of other units is similar to this. In addition, all or some of these units may be integrated or may be separately implemented. The processing element herein may be an integrated circuit having a signal processing capability. In an implementation process, steps in the foregoing methods or the foregoing units can be implemented by using a hardware integrated logical circuit in the processing element, or by using instructions in a form of software. In addition, the foregoing receiving unit is a receiving control unit, and may receive, by using a receiving apparatus of the terminal device or the network device, for example, an antenna or a radio frequency apparatus, information sent by the network device. The foregoing sending unit is a sending control unit, and may send information to the terminal device by using a sending apparatus of the terminal device or the network device, for example, an antenna or a radio frequency apparatus.

For example, the foregoing units may be configured as one or more integrated circuits that perform the foregoing methods, for example, one or more application-specific integrated circuits (Application Specific Integrated Circuit, ASIC), one or more microprocessors (digital signal processor, DSP), or one or more field programmable gate arrays (Field Programmable Gate Array, FPGA). For another example, when one of the units is implemented in a form of a program scheduled by the processing element, the processing element may be a general-purpose processor, for example, a central processing unit (Central Processing Unit, CPU) or another processor that can invoke a program. For another example, these units may be integrated together and implemented in a form of a system-on-a-chip (system-on-a-chip, SOC).

Figure 15:
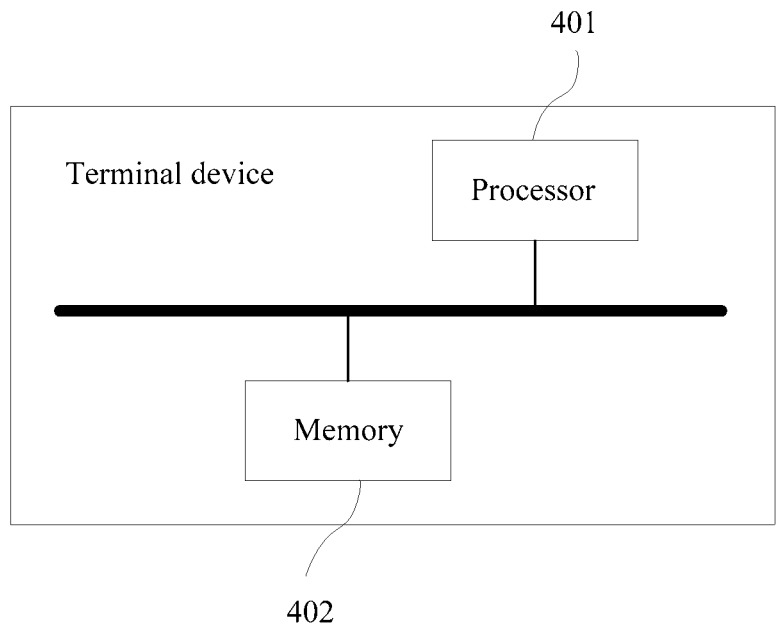
FIG. 15 is a third schematic structural diagram of a terminal device according to an embodiment of this application.

FIG. 15 is a third schematic structural diagram of a terminal device according to an embodiment of this application. It can be learned from FIG. 15 that this embodiment provides still another terminal device. The terminal device is configured to execute the foregoing data exchange method corresponding to FIG. 3 to FIG. 9. Specifically, the terminal device includes a processor 401 and a memory 402. There may be one or more processors 401, which may work separately or in cooperation. The processor 401 is configured to:
  obtain resource information that can be used to communicate with another terminal device, where the resource information is used to indicate a time-frequency resource and an antenna port used for communication; and
  communicate with the another terminal device by using the resource information.

The antenna port may be corresponding to at least one of an antenna polarization direction, an antenna reference symbol sequence, and an antenna reference pattern, and the time-frequency resource includes time domain resource information and frequency domain resource information. Further, when the antenna port is corresponding to the antenna polarization direction, when communicating with the another terminal device by using the resource information, the processor 401 may be configured to:
  send scheduling information and data information to the another terminal device by using the time-frequency resource and the antenna polarization direction.

The scheduling information includes the antenna polarization direction and the time-frequency resource used to carry the data information, and time-frequency resources and antenna polarization directions that are used by any two terminal devices to send scheduling information and data information to other terminal devices are the same or different. Herein, that time-frequency resources and antenna polarization directions that are used by any two terminal devices to send scheduling information and data information to other terminal devices are different means that time-frequency resources and/or antenna polarization directions that are used by any two terminal devices to send scheduling information and data information to other terminal devices are different. In this case, the processor 401 may perform steps S101 to S102 of the method shown in FIG. 3.

The memory 402 is configured to store a program for implementing the foregoing method embodiment or all the units in the embodiment shown in FIG. 12. The processor 401 invokes the program to perform operations in the foregoing method embodiment, so as to implement functions of all the units shown in FIG. 12.

Alternatively, some or all of the foregoing units may also be implemented in a form of an integrated circuit that is embedded in a chip of the terminal device. In addition, the units may be independently implemented, or may be integrated together. In other words, the foregoing units may be configured as one or more integrated circuits that perform the foregoing method, for example, one or more application-specific integrated circuits (Application Specific Integrated Circuit, ASIC), one or more microprocessors (digital signal processor, DSP), or one or more field programmable gate arrays (Field Programmable Gate Array, FPGA).

Further, an implementable manner of sending the scheduling information and the data information to the another terminal device by using the time-frequency resource and the antenna polarization direction is as follows:
  a processor 401 in a first terminal device is configured to broadcast first scheduling information and first data information to another terminal device by using a first time-frequency resource and a first antenna polarization direction; and
  a processor 401 in a second terminal device is configured to broadcast second scheduling information and second data information to another terminal device by using a second time-frequency resource and a second antenna polarization direction; where
  the first time-frequency resource is the same as or partially the same as the second time-frequency resource, and the first antenna polarization direction is different from the second antenna polarization direction; and it should be noted that a manner in which the first antenna polarization direction is different from the second antenna polarization direction is as follows: The first antenna polarization direction is orthogonal to the second antenna polarization direction.

Further, another implementable manner of sending the scheduling information and the data information to the another terminal device by using the time-frequency resource and the antenna polarization direction is as follows:
  a processor 401 in a first terminal device is configured to broadcast first scheduling information and first data information to another terminal device by using a first time-frequency resource and a first antenna polarization direction; and
  a processor 401 in a second terminal device is configured to broadcast second scheduling information and second data information to another terminal device by using a second time-frequency resource and a second antenna polarization direction; where the first time-frequency resource is different from the second time-frequency resource, and the first antenna polarization direction is the same as or different from the second antenna polarization direction.

Further, still another implementable manner of sending the scheduling information and the data information to the another terminal device by using the time-frequency resource and the antenna polarization direction is as follows:
- a processor 401 in a first terminal device is configured to broadcast first scheduling information and first data information to another terminal device by using a first time-frequency resource and a first antenna polarization direction; and
- a processor 401 in a second terminal device is configured to broadcast second scheduling information and second data information to another terminal device by using a second time-frequency resource and a second antenna polarization direction; where
- when a distance between the processor 401 in the first terminal device and the processor 401 in the second terminal device is greater than or equal to a preset distance threshold, the first time-frequency resource is the same as or different from the second time-frequency resource, and the first antenna polarization direction is the same as or different from the second antenna polarization direction.

In addition, when the antenna port is corresponding to an antenna polarization direction, and an antenna reference symbol sequence or an antenna reference pattern, that is, the antenna port is corresponding to the antenna polarization direction and the antenna reference symbol sequence, or the antenna port is corresponding to the antenna polarization direction and the antenna reference pattern, when allocating the time-frequency resource and the antenna port for the communicative connection between the terminal device and the another terminal device based on the antenna polarization capability of the terminal, the processor 401 may be configured to:
- send the scheduling information and the data information to the another terminal device by using the time-frequency resource, the antenna polarization direction, and the antenna reference symbol sequence or the antenna reference pattern; where
- the scheduling information includes the antenna polarization direction, the antenna reference symbol sequence or the antenna reference pattern, and the time-frequency resource used to carry the data information, and time-frequency resources, antenna polarization directions, and antenna reference symbol sequences or antenna reference patterns used by any two terminal devices to send scheduling information and data information to other terminal devices are the same or different.

Further, an implementable manner of sending the scheduling information and the data information to the another terminal device by using the time-frequency resource, the antenna polarization direction, and the antenna reference symbol sequence or the antenna reference pattern is as follows:
- a processor 401 in a first terminal device is configured to broadcast first scheduling information and first data information to another terminal device by using a first time-frequency resource, a first antenna polarization direction, and a first antenna reference symbol sequence or a first antenna reference pattern; and
- a processor 401 in a second terminal device is configured to broadcast second scheduling information and second data information to another terminal device by using a second time-frequency resource, a second antenna polarization direction, and a second antenna reference symbol sequence or a second antenna reference pattern; where
- the first time-frequency resource is the same as or partially the same as the second time-frequency resource, the first antenna polarization direction is different from the second antenna polarization direction, and the first antenna reference symbol sequence is different from the second antenna reference symbol sequence, or the first antenna reference pattern is different from the second antenna reference pattern.

It should be noted that a manner of implementing "the first antenna polarization direction is different from the second antenna polarization direction, and the first antenna reference symbol sequence is different from the second antenna reference symbol sequence, or the first antenna reference pattern is different from the second antenna reference pattern" is as follows: The first antenna polarization direction is orthogonal to the second antenna polarization direction, and the first antenna reference symbol sequence is orthogonal to the second antenna reference symbol sequence, or the first antenna reference pattern is orthogonal to the second antenna reference pattern.

Further, another implementable manner of sending the scheduling information and the data information to the another terminal device by using the time-frequency resource, the antenna polarization direction, and the antenna reference symbol sequence or the antenna reference pattern is as follows:
- a processor 401 in a first terminal device is configured to broadcast first scheduling information and first data information to another terminal device by using a first time-frequency resource, a first antenna polarization direction, and a first antenna reference symbol sequence or a first antenna reference pattern; and
- a processor 401 in a second terminal device is configured to broadcast second scheduling information and second data information to another terminal device by using a second time-frequency resource, a second antenna polarization direction, and a second antenna reference symbol sequence or a second antenna reference pattern; where
- the first time-frequency resource is different from the second time-frequency resource, the first antenna polarization direction is the same as or different from the second antenna polarization direction, and the first antenna reference symbol sequence is the same as or different from the second antenna reference symbol sequence, or the first antenna reference pattern is the same as or different from the second antenna reference pattern.

Further, still another implementable manner of sending the scheduling information and the data information to the another terminal device by using the time-frequency resource, the antenna polarization direction, and the antenna reference symbol sequence or the antenna reference pattern is as follows:
- a processor 401 in a first terminal device is configured to broadcast first scheduling information and first data information to another terminal device by using a first time-frequency resource, a first antenna polarization direction, and a first antenna reference symbol sequence or a first antenna reference pattern; and
- a processor 401 in a second terminal device is configured to broadcast second scheduling information and second data information to another terminal device by using a second time-frequency resource, a second antenna polarization direction, and a second antenna reference symbol sequence or a second antenna reference pattern; where when a distance between the processor 401 in the first terminal device and the processor 402 in the second terminal device is greater than or equal to a preset distance threshold, the first time-frequency resource is the same as or different from the second time-frequency resource, the first antenna polarization direction is the same as or different from the second antenna polarization direction, and the first antenna reference symbol sequence is the same as or different from the second antenna reference symbol sequence, or the first antenna reference pattern is the same as or different from the second antenna reference pattern.

Further, when the foregoing data exchange method is used in application scenario 1, when obtaining the resource information that can be used to communicate with the another terminal device, the processor 401 may be configured to:

before a scheduling instruction sent by a network device is received, send a terminal capability to the network device, where the terminal capability includes at least an antenna polarization capability of the terminal;

send, to the network device, a communication request for communicating with the another terminal device, so that the network device allocates the time-frequency resource and the antenna port for the communicative connection between the terminal device and the another terminal device based on the antenna polarization capability of the terminal; and receive the scheduling instruction sent by the network device, where the scheduling instruction includes the time-frequency resource and the antenna port that are allocated for the communicative connection between the terminal device and the another terminal device, and time-frequency resources and antenna ports that are allocated to any two terminal devices to communicatively connect to other terminal devices are the same or different.

In addition, when the foregoing data exchange method is used in application scenario 2, when obtaining the resource information that can be used to communicate with the another terminal device, the processor 401 may be configured to:

obtain information about a used resource occupied by a surrounding terminal, where the information about the used resource includes at least a time-frequency resource and an antenna port.

Specifically, when obtaining the information about the used resource occupied by the surrounding terminal, the processor 401 may be configured to:

receive scheduling information sent by the surrounding terminal; and obtain, based on the scheduling information, the information about the used resource occupied by the surrounding terminal.

Further, when obtaining, based on the scheduling information, the information about the used resource occupied by the surrounding terminal, the processor 401 may be configured to:

demodulate the scheduling information to obtain the information about the used resource corresponding to a communication resource occupied by the surrounding terminal to send data information.

An implementable manner of demodulating the scheduling information includes: demodulating the scheduling information in a preset spatial multiplexing detection manner, to obtain the antenna port and the time-frequency resource used to carry the data information that are in the scheduling information.

Another implementable manner of demodulating the scheduling information includes: demodulating the scheduling information in a preset non-spatial multiplexing detection manner, to obtain the antenna port and the time-frequency resource used to carry the data information that are in the scheduling information.

The time-frequency resource and the antenna port for communicating with the another terminal device are selected based on the information about the used resource, where the selected time-frequency resource and the selected antenna port are the same as or different from the time-frequency resource and the antenna port that are occupied by the surrounding terminal.

The terminal device in the embodiment shown in FIG. 15 may be configured to execute the technical solution of the embodiment shown in FIG. 1 to FIG. 9 in the foregoing method, and implementation principles and technical effects of the terminal device are similar and are not described herein again.

Figure 16:
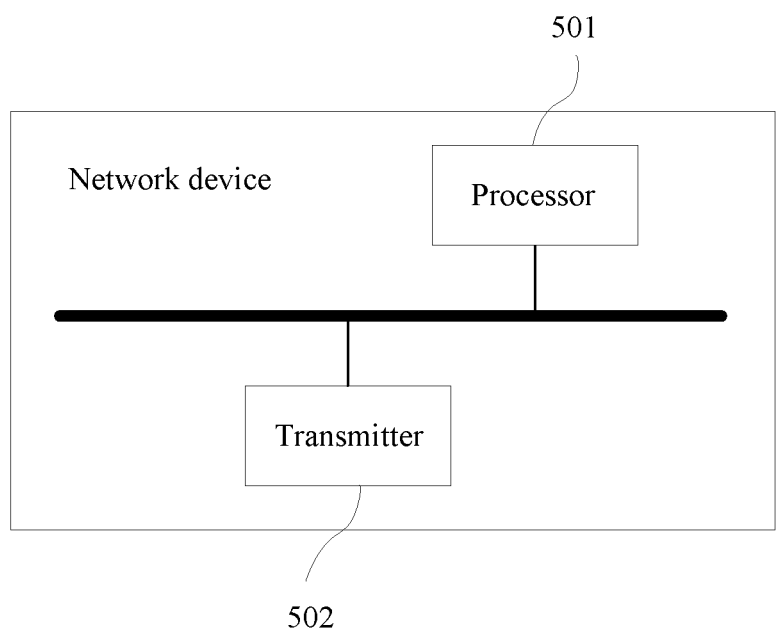
FIG. 16 is a second schematic structural diagram of a network device according to an embodiment of this application.

FIG. 16 is a second schematic structural diagram of a network device according to an embodiment of this application. It can be learned from FIG. 16 that this application provides another network device. The network device is configured to execute the data exchange method shown in FIG. 10. Specifically, the network device includes a processor 501 and a transmitter 502. There may be one or more processors 501, which may work separately or in cooperation.

The processor 501 is configured to allocate a time-frequency resource and an antenna port for a communicative connection between a terminal device and another terminal device, where time-frequency resources and antenna ports that are allocated to any two terminal devices that communicatively connect to other terminal devices are the same or different. When each antenna port is corresponding to an antenna polarization direction, the difference herein includes: Time-frequency resources and/or antenna polarization directions that are allocated to any two terminal devices to communicatively connect to other terminal devices are different.

The transmitter 502 is configured to send the allocated time-frequency resource and antenna polarization direction to the terminal device by using a scheduling instruction.

In specific application, the antenna port may be corresponding to at least one of an antenna polarization direction, an antenna reference symbol sequence, and an antenna reference pattern, and the time-frequency resource includes time domain resource information and frequency domain resource information. In addition, the processor 501 may perform step S201 of the method shown in FIG. 10, and the transmitter 502 may perform step S202 of the method shown in FIG. 10.

Further, when allocating the time-frequency resource and the antenna port for the communicative connection between the terminal device and the another terminal device, the processor 501 may be configured to:

receive a communication request for communicatively connecting to the another terminal device that is sent by the terminal device;

receive a terminal capability sent by the terminal device, where the terminal capability includes at least an antenna polarization capability of the terminal; and allocate the time-frequency resource and the antenna port for the communicative connection between the terminal device and the another terminal device based on the antenna polarization capability of the terminal.

Further, when the antenna port is corresponding to only the antenna polarization direction, an implementable manner in which the processor 501 allocates the time-frequency resource and the antenna polarization direction for the communicative connection between the terminal device and the another terminal device based on the antenna polarization capability of the terminal includes:

allocating a first time-frequency resource and a first antenna polarization direction for a communicative connection between a first terminal device and another terminal device; and allocating a second time-frequency resource and a second antenna polarization direction for a communicative connection between the first terminal device and another terminal device; where the first time-frequency resource is the same as or partially the same as the second time-frequency resource, and the first antenna polarization direction is different from the second antenna polarization direction.

A manner in which the first antenna polarization direction is different from the second antenna polarization direction is as follows: The first antenna polarization direction is orthogonal to the second antenna polarization direction.

Further, another implementable manner of allocating the time-frequency resource and the antenna port for the communicative connection between the terminal device and the another terminal device based on the antenna polarization capability of the terminal includes:

allocating a first time-frequency resource and a first antenna polarization direction for a communicative connection between a first terminal device and another terminal device; and allocating a second time-frequency resource and a second antenna polarization direction for a communicative connection between a second terminal device and another terminal device; where the first time-frequency resource is different from the second time-frequency resource, and the first antenna polarization direction is the same as or different from the second antenna polarization direction.

Further, still another implementable manner of allocating the time-frequency resource and the antenna port for the communicative connection between the terminal device and the another terminal device based on the antenna polarization capability of the terminal includes:

allocating a first time-frequency resource and a first antenna polarization direction for a communicative connection between a first terminal device and another terminal device; and allocating a second time-frequency resource and a second antenna polarization direction for a communicative connection between a second terminal device and another terminal device; where when a distance between the first terminal device and the second terminal device is greater than or equal to a preset distance threshold, the first time-frequency resource is the same as or different from the second time-frequency resource, and the first antenna polarization direction is the same as or different from the second antenna polarization direction.

In addition, when the antenna port is corresponding to an antenna polarization direction, and an antenna reference symbol sequence or an antenna reference pattern, that is, the antenna port is corresponding to the antenna polarization direction and the antenna reference symbol sequence, or the antenna port is corresponding to the antenna polarization direction and the antenna reference pattern, an implementable manner of allocating the time-frequency resource and the antenna port for the communicative connection between the terminal device and the another terminal device based on the antenna polarization capability of the terminal includes:

allocating a first time-frequency resource, a first antenna polarization direction, and a first antenna reference symbol sequence or a first antenna reference pattern for a communicative connection between a first terminal device and another terminal device; and allocating a second time-frequency resource, a second antenna polarization direction, and a second antenna reference symbol sequence or a second antenna reference pattern for a communicative connection between a second terminal device and another terminal device; where the first time-frequency resource is the same as or partially the same as the second time-frequency resource, the first antenna polarization direction is different from the second antenna polarization direction, and the first antenna reference symbol sequence is different from the second antenna reference symbol sequence, or the first antenna reference pattern is different from the second antenna reference pattern.

It should be noted that a manner of implementing "the first antenna polarization direction is different from the second antenna polarization direction, and the first antenna reference symbol sequence is different from the second antenna reference symbol sequence, or the first antenna reference pattern is different from the second antenna reference pattern" is as follows: The first antenna polarization direction is orthogonal to the second antenna polarization direction, and the first antenna reference symbol sequence is orthogonal to the second antenna reference symbol sequence, or the first antenna reference pattern is orthogonal to the second antenna reference pattern.

Further, another implementable manner of allocating the time-frequency resource and the antenna port for the communicative connection between the terminal device and the another terminal device based on the antenna polarization capability of the terminal includes:

allocating a first time-frequency resource, a first antenna polarization direction, and a first antenna reference symbol sequence or a first antenna reference pattern for a communicative connection between a first terminal device and another terminal device; and allocating a second time-frequency resource, a second antenna polarization direction, and a second antenna reference symbol sequence or a second antenna reference pattern for a communicative connection between a second terminal device and another terminal device; where the first time-frequency resource is different from the second time-frequency resource, the first antenna polarization direction is the same as or different from the second antenna polarization direction, and the first antenna reference symbol sequence is the same as or different from the second antenna reference symbol sequence, or the first antenna reference pattern is the same as or different from the second antenna reference pattern.

Further, still another implementable manner of allocating the time-frequency resource and the antenna port for the communicative connection between the terminal device and the another terminal device based on the antenna polarization capability of the terminal includes:

allocating a first time-frequency resource, a first antenna polarization direction, and a first antenna reference symbol sequence or a first antenna reference pattern for a communicative connection between a first terminal device and another terminal device; and allocating a second time-frequency resource, a second antenna polarization direction, and a second antenna reference symbol sequence or a second antenna reference pattern for a communicative connection between a second terminal device and another terminal device; where when a distance between the first terminal device and the second terminal device is greater than or equal to a preset distance threshold, the first time-frequency resource is the same as or different from the second time-frequency resource, the first antenna polarization direction is the same as or different from the second antenna polarization direction, and the first antenna reference symbol sequence is the same as or different from the second antenna reference symbol sequence, or the first antenna reference pattern is the same as or different from the second antenna reference pattern.

The terminal device in the embodiment shown in FIG. 16 may be configured to execute the technical solution of the embodiment shown in FIG. 10 in the foregoing method, and implementation principles and technical effects of the terminal device are similar and are not described herein again.

Figure 17:
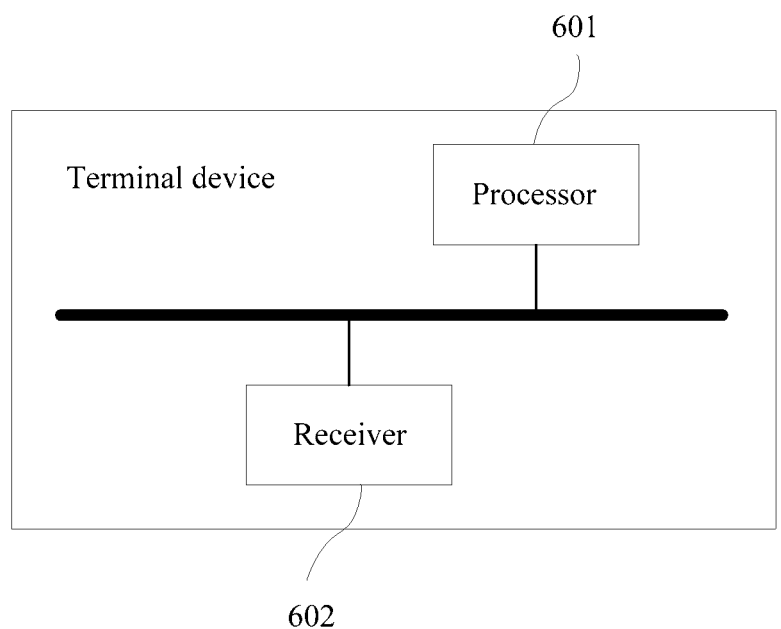
FIG. 17 is a fourth schematic structural diagram of a terminal device according to an embodiment of this application.

FIG. 17 is a fourth schematic structural diagram of a terminal device according to an embodiment of this application. As shown in FIG. 17, this embodiment provides yet another terminal device. The terminal device is configured to execute the foregoing data exchange method corresponding to FIG. 11. Specifically, the terminal device includes a receiver 602 and a processor 601. There may be one or more processors 601, which may work separately or in cooperation.

The receiver 602 is configured to receive scheduling information sent by another terminal device.

The processor 601 is configured to obtain, based on the scheduling information, information about a resource used to carry data information, where the resource information is used to indicate a time-frequency resource and an antenna port used for communication.

The antenna port may be corresponding to at least one of an antenna polarization direction, an antenna reference symbol sequence, and an antenna reference pattern, and the time-frequency resource includes time domain resource information and frequency domain resource information. When each antenna port is corresponding to an antenna polarization direction, time-frequency resources and/or antenna polarization directions that are used by the receiver 602 to receive scheduling information sent by any two other terminal devices are different. The receiver 602 may perform step S301 of the method shown in FIG. 11, and the processor 601 may perform step S302 of the method shown in FIG. 11.

Further, when the antenna port is corresponding to an antenna polarization direction, for the processor 601, an implementable manner of obtaining, based on the scheduling information, the information about the resource used to carry the data information includes:

demodulating the scheduling information, obtaining the antenna polarization direction and the time-frequency resource used to carry the data information, and obtaining, based on the time-frequency resource, the data information sent by the another terminal device.

Specifically, when demodulating the scheduling information, the processor 601 may be configured to:

demodulate the scheduling information in a preset spatial multiplexing detection manner, to obtain the antenna polarization direction and the time-frequency resource used to carry the data information that are in the scheduling information; and/or demodulate the scheduling information in a preset non-spatial multiplexing detection manner, to obtain the antenna polarization direction and the time-frequency resource used to carry the data information that are in the scheduling information.

It should be noted that, when the antenna port is corresponding to the antenna polarization direction and the antenna reference symbol sequence, or the antenna port is corresponding to the antenna polarization direction and the antenna reference pattern, and when the scheduling information is demodulated, the time-frequency resource used to carry the data information, the antenna polarization direction, and the antenna reference symbol sequence that are in the scheduling information may be obtained; or the time-frequency resource used to carry the data information, the antenna polarization direction, and the antenna reference pattern that are in the scheduling information may be obtained.

Specifically, because the antenna port may be corresponding to at least one of the antenna polarization direction, the antenna reference symbol sequence, or the antenna reference pattern. The following gives description by using a case in which the antenna port is corresponding to the antenna polarization direction. In this case, for the terminal device, when other terminal devices configured to communicate with the terminal device include at least a first terminal device and a second terminal device, a first manner in which the receiver 602 receives the scheduling information sent by the another terminal device includes:

receiving first scheduling information sent by a first terminal device by using a first time-frequency resource and a first antenna polarization direction; and receiving second scheduling information sent by a second terminal device by using a second time-frequency resource and a second antenna polarization direction; where the first time-frequency resource is the same as or partially the same as the second time-frequency resource, and the first antenna polarization direction is different from the second antenna polarization direction.

A manner in which the first antenna polarization direction is different from the second antenna polarization direction is as follows: The first antenna polarization direction is orthogonal to the second antenna polarization direction. The first terminal device and the second terminal device communicatively connect to the terminal device by using different antenna polarization directions and using a same time-frequency resource or partially the same time-frequency resources. This helps improve spectrum efficiency and alleviate communication interference between the first terminal device and the second terminal device, thereby ensuring stability and reliability of communication information transmission.

In addition, a second manner in which the receiver 602 can receive the scheduling information sent by the another terminal device includes:

receiving first scheduling information sent by a first terminal device by using a first time-frequency resource and a first antenna polarization direction; and receiving second scheduling information sent by a second terminal device by using a second time-frequency resource and a second antenna polarization direction; where the first time-frequency resource is different from the second time-frequency resource, and the first antenna polarization direction is the same as or different from the second antenna polarization direction.

The first terminal device and the second terminal device communicatively connect to the terminal device by using the same or different antenna polarization directions and different time-frequency resources. Because the time-frequency resources are orthogonal, user signals do not interfere with each other.

It should be noted that a third manner in which the receiver 602 receives the scheduling information sent by the another terminal device includes:

receiving first scheduling information sent by a first terminal device by using a first time-frequency resource and a first antenna polarization direction; and receiving second scheduling information sent by a second terminal device by using a second time-frequency resource and a second antenna polarization direction; where when a distance between the first terminal device and the second terminal device is greater than or equal to a preset distance threshold, the first time-frequency resource is the same as or different from the second time-frequency resource, and the first antenna polarization direction is the same as or different from the second antenna polarization direction.

When the distance between the first terminal device and the second terminal device is long enough, a signal of the first terminal device and a signal of the second terminal device do not interfere with each other. Therefore, the first terminal device and the second terminal device may communicatively connect to the terminal device by using the same or different antenna polarization directions and the same or different time-frequency resources.

The terminal device in the embodiment shown in FIG. 17 may be configured to execute the technical solution of the embodiment shown in FIG. 11 in the foregoing method, and implementation principles and technical effects of the terminal device are similar and are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave, or the like) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

A person skilled in the art should be aware that in the foregoing one or more examples, functions described in the embodiments of this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

What is claimed is:

1. A data exchange method, comprising:
obtaining, by a first terminal device, first resource information usable to communicate with a third terminal device, wherein the first resource information indicates a first time-frequency resource and a first antenna port corresponding to a first antenna polarization direction;
obtaining, by a second terminal device, second resource information usable to communicate with the third terminal device, wherein the second resource information indicates a second time-frequency resource and a second antenna port corresponding to second first antenna polarization direction;
sending, by the first terminal device, first scheduling information and first data information to the third terminal device using the first time-frequency resource and the first antenna polarization direction;
sending, by the second terminal device, second scheduling information and second data information to the third terminal device using the second time-frequency resource and the second antenna polarization direction; and, wherein
the first scheduling information comprises the first antenna polarization direction and the first time-frequency resource carrying the first data information, and the second scheduling information comprises the second antenna polarization direction and the second time-frequency resource carrying the second data information, wherein
the first and second time-frequency resources are different; and/or
the first and second antenna polarization directions are different; and, wherein obtaining, by the first terminal device, the first resource information usable to communicate with the third terminal device comprises:
obtaining, by the first terminal device, information about a used resource occupied by a surrounding terminal, wherein the information about the used resource indicates a time-frequency resource and an antenna polarization direction that have been occupied for communication; and
selecting, by the first terminal device based on the information about the used resource, the first time-frequency resource and the first antenna polarization direction for communicating with the third terminal device, wherein at least one of the selected time-frequency resource and the selected antenna polarization direction is different from the time-frequency resource and the antenna polarization direction occupied by the surrounding terminal.

2. The method according to claim 1, wherein sending, by the first terminal device, the first scheduling information and the first data information to third terminal device using the first time-frequency resource and the first antenna polarization direction comprises:

broadcasting, by the first terminal device, the first scheduling information and the first data information to the third terminal device using the first time-frequency resource and the first antenna polarization direction; and, wherein sending, by the second terminal device, the second scheduling information and second data information to third terminal device using the second time-frequency resource and the second antenna polarization direction comprises:

broadcasting, by the second terminal device, the second scheduling information and second data information to the third terminal device using the second time-frequency resource and the second antenna polarization direction; and, wherein the first time-frequency resource is the same as or partially the same as the second time-frequency resource, and the first antenna polarization direction is different from the second antenna polarization direction.

3. The method according to claim 2, wherein the first antenna polarization direction is orthogonal to the second antenna polarization direction.

4. The method according to claim 1, wherein sending, by the first terminal device, the first scheduling information and the first data information to third terminal device using the first time-frequency resource and the first antenna polarization direction comprises:

broadcasting, by the first terminal device, the first scheduling information and the first data information to the third terminal device using the first time-frequency resource and the first antenna polarization direction; and, wherein sending, by the second terminal device, the second scheduling information and second data information to third terminal device using the second time-frequency resource and the second antenna polarization direction comprises:

broadcasting, by the second terminal device, the second scheduling information and second data information to the third terminal device using the second time-frequency resource and the second antenna polarization direction; and, wherein the first time-frequency resource is different from the second time-frequency resource, and the first antenna polarization direction is the same as or different from the second antenna polarization direction.

5. The method according to claim 1, wherein the obtaining, by the first terminal device, the first resource information usable to communicate with the first terminal device comprises:

receiving, by the first terminal device, a scheduling instruction sent by a network device, wherein the scheduling instruction comprises the first time-frequency resource and the first antenna polarization direction allocated for the communicative connection between the terminal device and the third terminal device.

6. The method according to claim 5, wherein before receiving, by the first terminal device, the scheduling instruction sent by the network device, the method further comprises:

sending, by first the terminal device, a terminal capability to the network device, wherein the terminal capability comprises at least an antenna polarization capability of the first terminal; and sending, by the first terminal device to the network device, a communication request for communicating with another terminal device, so that the network device allocates the time-frequency resource and the antenna polarization direction for the communicative connection between the first terminal device and the third terminal device based on the antenna polarization capability of the first terminal.

7. The method according to claim 1, wherein obtaining, by the first terminal device, the information about the used resource occupied by the surrounding terminal comprises:

receiving, by the first terminal device, scheduling information sent by the surrounding terminal; and obtaining, by the first terminal device based on the scheduling information, the time-frequency resource and the antenna polarization direction occupied by the surrounding terminal.

8. The method according to claim 7, wherein obtaining, by the first terminal device based on the scheduling information, the information about the used resource occupied by the surrounding terminal comprises:

demodulating, by the first terminal device, the scheduling information sent by the surrounding terminal to obtain the time-frequency resource and the antenna polarization direction occupied by the surrounding terminal.

9. The method according to claim 8, wherein demodulating, by the first terminal device, the scheduling information sent by the surrounding terminal comprises:

demodulating, by the first terminal device, the scheduling information sent by the surrounding terminal in a preset spatial multiplexing detection manner, to obtain the antenna polarization direction and the time-frequency resource carrying the data information in the scheduling information sent by the surrounding terminal; and/or demodulating, by the first terminal device, the scheduling information sent by the surrounding terminal in a preset non-spatial multiplexing detection manner, to obtain the antenna polarization direction and the time-frequency resource carrying the data information in the scheduling information sent by the surrounding terminal.

10. A data exchange method, comprising:

allocating, by a network device, a first time-frequency resource and a first antenna port for a communication connection between a first terminal device and a third terminal device, wherein the first antenna port corresponds to a first antenna polarization direction;

allocating, by the network device, a second time-frequency resource and a second antenna port for a communication connection between a second terminal device and a third terminal device, wherein the second antenna port corresponds to a second antenna polarization direction, and wherein the first and second time-frequency resources are different; and/or the first and second antenna polarization directions are different and, wherein sending, by the network device, the allocated first and second time-frequency resources and the first and second antenna polarization direction to the first and second terminal devices respectively using a scheduling instruction; and, wherein allocating, by the network device, the first time-frequency resource and the first antenna port for the communication connection between the first terminal device and the third terminal device comprises:

receiving, by the network device, a communication request sent by the first terminal device for communicatively connecting to the third terminal device;

receiving, by the network device, a terminal capability sent by the terminal device, wherein the terminal capability comprises at least an antenna polarization capability of the first terminal; and allocating, by the network device, the time-frequency resource and the antenna polarization direction for the communication connection between the first terminal device and the third terminal device based on the antenna polarization capability of the first terminal.

11. The method according to claim 10, wherein allocating, by the network device, the first time-frequency resource and the antenna polarization direction for the communication connection between the first terminal device and the third terminal device based on the antenna polarization capability of the third terminal comprises:

allocating, by the network device, a first time-frequency resource and a first antenna polarization direction for the communication connection between the first terminal device and the third terminal device; and allocating, by the network device, a second time-frequency resource and a second antenna polarization direction for the communication connection between the second terminal device and another terminal device; and, wherein the first time-frequency resource is the same as or partially the same as the second time-frequency resource, and the first antenna polarization direction is different from the second antenna polarization direction.

12. The method according to claim 11, wherein the first antenna polarization direction is orthogonal to the second antenna polarization direction.

13. The method according to claim 10, wherein allocating, by the network device, the first time-frequency resource and the first antenna polarization direction for the communication connection between the first terminal device and the second terminal device based on the antenna polarization capability of the first terminal comprises:

allocating, by the network device, the first time-frequency resource and the first antenna polarization direction for the communication connection between the first terminal device and the third terminal device; and allocating, by the network device, the second time-frequency resource and the second antenna polarization direction for the communication connection between the second terminal device and the third terminal device; and, wherein the first time-frequency resource is different from the second time-frequency resource, and the first antenna polarization direction is the same as or different from the second antenna polarization direction.

14. A data exchange method, comprising:
receiving, by a third terminal device, first scheduling information sent by a first terminal device;
receiving, by the third terminal device, second scheduling information sent by a second terminal device;

obtaining, by the third terminal device based on the first scheduling information, first resource information about a first resource for carrying first data information, wherein the first resource information indicates a first time-frequency resource and a first antenna port corresponding to a first antenna polarization direction used for communication; and obtaining, by the third terminal device based on the second scheduling information, second resource information about a second resource for carrying second data information, wherein the second resource information indicates a second time-frequency resource and a second antenna port corresponding to a second antenna polarization direction used for communication; and, wherein the first and the second time-frequency resources are different; and/or the first and second antenna polarization directions are different; and, wherein the first scheduling information is obtained by the first terminal device in the following follow manner:

obtaining, by the first terminal device, information about a used resource occupied by a surrounding terminal, wherein the information about the used resource indicates a time-frequency resource and an antenna polarization direction that have been occupied for communication; and selecting, by the first terminal device based on the information about the used resource, the first time-frequency resource and the first antenna polarization direction for communicating with the third terminal device, wherein at least one of the selected time-frequency resource and the selected antenna polarization direction is different from the time-frequency resource and the antenna polarization direction occupied by the surrounding terminal.

15. The method according to claim 14, wherein receiving, by the third terminal device, the first scheduling information sent by the first terminal device comprises:

receiving, by the third terminal device, first scheduling information sent by the first terminal device using the first time-frequency resource and the first antenna polarization direction; and receiving, by the third terminal device, the second scheduling information sent by the second terminal device comprises:

receiving, by the third terminal device, the second scheduling information sent by the second terminal device using the second time-frequency resource and the second antenna polarization direction; and, wherein the first time-frequency resource is the same as or partially the same as the second time-frequency resource, and the first antenna polarization direction is different from the second antenna polarization direction.

16. The method according to claim 15, wherein the first antenna polarization direction is orthogonal to the second antenna polarization direction.

17. The method according to claim 14, wherein receiving, by the third terminal device, the first scheduling information sent by the first terminal device comprises:

receiving, by the third terminal device, the first scheduling information sent by the first terminal device using the first time-frequency resource and the first antenna polarization direction; and receiving, by the third terminal device, the second scheduling information sent by the second terminal device comprises:

receiving, by the third terminal device, the second scheduling information sent by the second terminal device using the second time-frequency resource and the second antenna polarization direction; and, wherein the first time-frequency resource is different from the second time-frequency resource, and the first antenna polarization direction is the same as or different from the second antenna polarization direction.

18. The method according to claim 14, wherein the obtaining, by the third terminal device based on the first scheduling information, information about the first resource for carrying first data information comprises:

demodulating, by the third terminal device, the first scheduling information;

obtaining the first antenna polarization direction and the second time-frequency resource carrying the data information; and obtaining, based on the time-frequency resource, the data information sent by another terminal device.

\* \* \* \* \*

UNITED STATES PATENT AND TRADEMARK OFFICE
CERTIFICATE OF CORRECTION

| | |
|---|---|
| PATENT NO. | : 11,051,315 B2 |
| APPLICATION NO. | : 16/587042 |
| DATED | : June 29, 2021 |
| INVENTOR(S) | : Zhe Wang et al. |

It is certified that error appears in the above-identified patent and that said Letters Patent is hereby corrected as shown below:

In the Claims

In Column 56, Line 35, in Claim 1, delete "second first" and insert -- second --.

In Column 58, Line 67, in Claim 10, delete "different" and insert -- different; --.

Signed and Sealed this
Twenty-fourth Day of May, 2022

*Katherine Kelly Vidal*

Katherine Kelly Vidal
*Director of the United States Patent and Trademark Office*